United States Patent
Tene et al.

(10) Patent No.: US 10,552,517 B2
(45) Date of Patent: Feb. 4, 2020

(54) AGGREGATING CONTENT FROM ONE OR MORE DOCUMENTS

(71) Applicant: Dropbox, Inc., San Francisco, CA (US)

(72) Inventors: Ran Tene, Tel Aviv (IL); Zach Johnston, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/720,765

(22) Filed: Sep. 29, 2017

(65) Prior Publication Data

US 2018/0189246 A1 Jul. 5, 2018

Related U.S. Application Data

(60) Provisional application No. 62/440,725, filed on Dec. 30, 2016.

(51) Int. Cl.
| | |
|---|---|
| G06F 17/21 | (2006.01) |
| G06F 17/22 | (2006.01) |
| G06F 17/24 | (2006.01) |
| G06F 17/27 | (2006.01) |

(52) U.S. Cl.
CPC ........ *G06F 17/2235* (2013.01); *G06F 17/218* (2013.01); *G06F 17/243* (2013.01); *G06F 17/245* (2013.01); *G06F 17/278* (2013.01)

(58) Field of Classification Search
CPC .. G06F 17/2235; G06F 17/218; G06F 17/243; G06F 17/245; G06F 17/278
USPC ........................................................ 715/208
See application file for complete search history.

(56) References Cited

U.S. PATENT DOCUMENTS

| | | | |
|---|---|---|---|
| 5,806,065 A | 9/1998 | Lomet | |
| 5,946,697 A | 8/1999 | Shen | |
| 6,405,225 B1 | 6/2002 | Apfel et al. | |
| 7,458,014 B1 | 11/2008 | Rubin et al. | |
| 7,574,675 B1* | 8/2009 | Linker | G06F 17/218 |
| | | | 715/767 |
| 8,060,394 B2 | 11/2011 | Woodings et al. | |
| 8,332,747 B2 | 12/2012 | Carro et al. | |
| 8,510,649 B2 | 8/2013 | Isidore | |

(Continued)

OTHER PUBLICATIONS

Kaufman, "How to Insert the Contents of One Word Document into Another," How-To Geek, accessible online at http://www.howtogeek.com/243422/how-to-insert-the-contents-of-one-word-document-into-another/, Feb. 2016.

(Continued)

*Primary Examiner* — Scott T Baderman
*Assistant Examiner* — Hassan Mrabi
(74) *Attorney, Agent, or Firm* — Keller Jolley Preece

(57) ABSTRACT

A computer implemented methods to allow a user to copy content from a rendered document into a target document using a linking command. The target document can be a new document or an existing document, that is not rendered. The copied content can include a link to the document from which the content was copied from. The linking command can be a refer command or a send to file command. A refer command allows a user to copy and paste the content from a rendered document into a target document with text associated with the refer command remaining in the rendered document. A send to file command allows a user to copy and paste the content from a rendered document into a target document with no trace left in the rendered document.

23 Claims, 34 Drawing Sheets

(56) References Cited

U.S. PATENT DOCUMENTS

| | | |
|---|---|---|
| 2003/0072031 A1 | 4/2003 | Kuwata et al. |
| 2003/0227487 A1 | 12/2003 | Hugh |
| 2006/0026516 A1 | 2/2006 | Legrys et al. |
| 2009/0241183 A1* | 9/2009 | Boss .................... G06F 17/218 |
| | | 726/17 |
| 2010/0031190 A1 | 2/2010 | Hall et al. |
| 2010/0058176 A1* | 3/2010 | Carro ...................... G06F 9/543 |
| | | 715/256 |
| 2010/0114977 A1* | 5/2010 | Bacher ................ G06F 17/3012 |
| | | 707/803 |
| 2013/0198621 A1* | 8/2013 | Wade .................... G06F 17/218 |
| | | 715/255 |
| 2013/0268850 A1 | 10/2013 | Kyprianou |
| 2014/0053061 A1 | 2/2014 | Chasen et al. |
| 2015/0154224 A1 | 6/2015 | Cui et al. |
| 2018/0189256 A1 | 7/2018 | Gonzalez |

OTHER PUBLICATIONS

MJ Tube, Dec 10, 2015, https://www.youtube.com/watch?v=Z5-5m51GwS0, "How to Exact Copy & Paste Excel Data into Word Table".
U.S. Appl. No. 15/720,803, dated Nov. 15, 2018, Office Action.
U.S. Appl. No. 15/720,803, dated Aug. 6, 2019, Office Action.

\* cited by examiner

AGGREGATING CONTENT FROM ONE OR MORE DOCUMENTS

CLAIM OF PRIORITY UNDER 35 U.S.C. § 119

The present Application for patent claims priority to U.S. Provisional Application No. 62/440,725 entitled "AGGREGATING CONTENT FROM ONE OR MORE DOCUMENTS" filed Dec. 30, 2016, which is hereby expressly incorporated by reference herein for all purposes.

TECHNICAL FIELD

The disclosed embodiments generally relate to aggregating content from one or more documents and more specifically relates to tagging content from a rendered document and copying the tagged content into another, non-rendered document.

BACKGROUND

A user may draft multiple documents that relate to the same topic. Sometimes, the user may want to aggregate content from the multiple documents into a single document. Similarly, in a social ecosystem where multiple users draft multiple documents, a user may want to aggregate content from the multiple documents into a single document. However, to aggregate content from multiple documents into a single document using conventional methodologies, such as copy and paste, are time consuming. For example, a user has to create a new document (e.g., target document), open another document (e.g., a source document), copy the desired content from the source document using a copy command, return to the target document and paste the desired content into the target document using a paste command. If the user wants to copy content from multiple source documents into the target document, the user would have to repeat all of these steps for each source document except for creating the new document. Since such a process is time consuming, there is a need to aggregate content from multiple documents into one or more documents in an efficient manner. In addition, once content is copied into a target document, the target document provides no indication of where the desired content was obtained from. Using conventional methodologies, the user can enter citation information and/or a link to the source document, however such a process is also time consuming. Thus, there is a need for an efficient methodology to copy content from a source document into a target document as well as an efficient methodology to insert a link to the source document in the target document.

Figure 1:
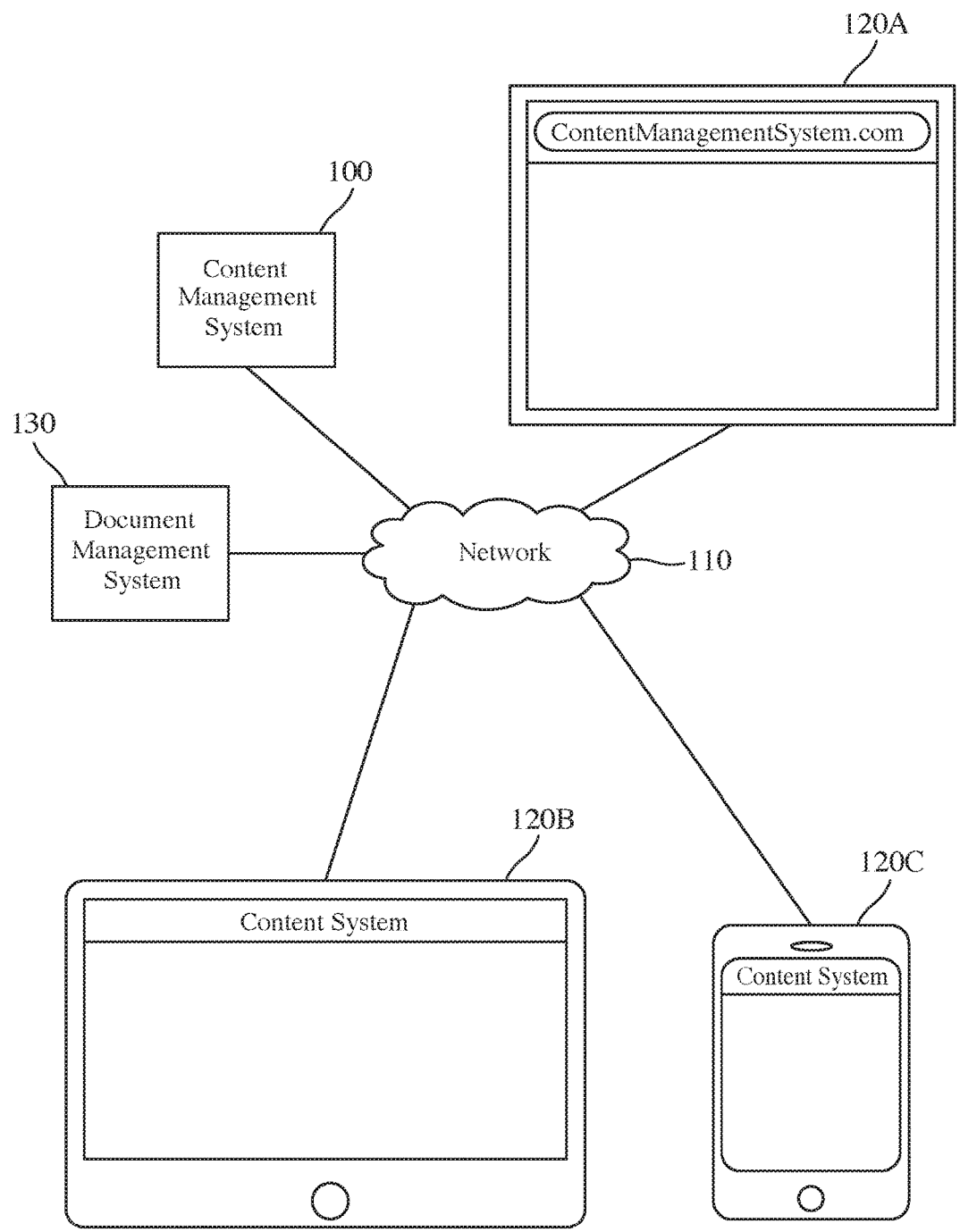
FIG. 1 is a system diagram of a system environment of a content management system and a document management system in accordance with an exemplary embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

The present application is directed to computer implemented methods, apparatuses and non-transitory computer readable mediums that allow a user to copy content from a rendered document into another document. The rendered document can be referred to as a source document. The other document can be referred to as a target document which can be a new document or an existing document. To do so, a system is provided in which a user can use linking commands to copy and paste content from the source document into the target document with a link to the source document being inserted into the target document. When the link in the target document is selected, the source document would be rendered or displayed. A "refer" command allows a user to copy and paste the content from a rendered document into a target document with text associated with the refer command remaining in the rendered document. For example, if after entering the text associated with the refer command in the rendered document, the rendered document can be saved with the text associated with the refer command in the rendered document being saved. A "send to file" command allows a user to copy and paste the content from a rendered document into a target document with no trace left in the rendered document. For example, as explained below in more detail, the send to file command does not add text to the rendered document, thus there is no text to be saved. The linking commands provide an efficient method to copy and paste content from a rendered source document into a target document. Each of the refer command and send to file command allows a user to copy and paste content from a rendered document into a target document without the need to open the target document while the rendered document remains rendered or displayed. The target document can be a non-rendered document. A non-rendered document can be a new document, a closed existing document, or an open existing document that is not currently active (e.g., the source document is the active document). If the target document is a new document, the linking command can cause the new document to be created with the tagged content inserted into the newly created document. Tagged content is the content associated with a linking command, e.g. a refer command or send to file command. Tagged content can be text, however, in one or more embodiments, content can include tables, figures, pictures, comments, or other items that can be rendered in a document. Thus, each of the linking commands provides an efficient method to copy content from a source document into a target document and provides a link in the target document with the link being a link to the source document from which the content was copied from.

System Overview

FIG. 1 shows a system environment including content management system 100, document management system 130 and client devices 120A, 120B, 120C (collectively or individually "120"). Content management system 100 provides content sharing, synchronization for users of client devices 120. These services allow users to share content with other users of client devices 120. In addition to content sharing, content management system 100 updates shared content responsive to changes and enables users to synchronize changes in content across multiple client devices 120. A user may synchronize content across multiple client devices 120 owned by the user and associated with the user's account, and the user may share content that is synchronized with devices associated with other users' accounts. The content stored by content management system 100 can include any type of data, such as digital data, documents, media (e.g., images, photos, videos, audio, streaming content), data files and databases, source and object code, recordings, and any other type of data or file. The content stored by content management system 100 may be organized in one configuration in folders, tables, or in other database structures (e.g., object oriented, key/value etc.). In one embodiment, the content shared by content management system 100 includes content created by using third party applications, e.g., word processors, video and image editors, database management systems, spreadsheet applications, code editors, and so forth, which are independent of content management system 100.

Users may create accounts at content management system 100 and store content thereon by transmitting such content from client device 120 to content management system 100. The content provided by users is associated with user accounts that may have various privileges. The privileges may include viewing the content item, modifying the content item, modifying user privileges related to the content item, and deleting the content item.

Document management system 130 provides users of client devices 120 with the ability to create, store, access, and share documents. Documents are computer files that a user can create using a document editor, such as a document editor which can be hosted by the document management system 130, or a document editor 270 provided on client device 120.

Client Device

Figure 2:
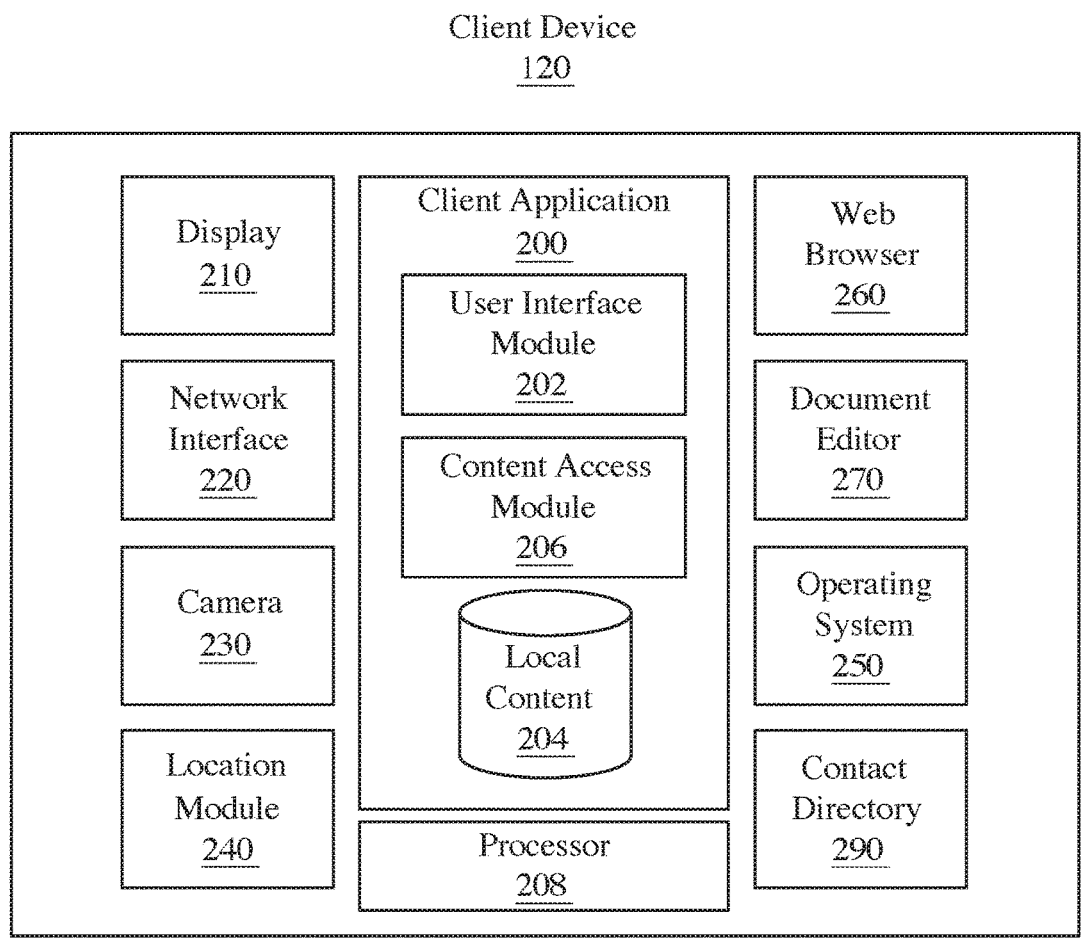
FIG. 2 is a block diagram of the components of a client device in accordance with an exemplary embodiment.

FIG. 2 shows a block diagram of the components of a client device 120 according to one embodiment. Client devices 120 generally include devices and modules for communicating with content management system 100 and a user of client device 120. Client device 120 can include a display 210 for providing information to the user, and in certain client devices 120 includes a touchscreen. Client device 120 can also include a network interface 220 for communicating with content management system 100 via network 110. Client device 120 can include one or more processors 208 for executing software, modules and/or components. Other components of a client device 120 that are not material are not shown, for example, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and optionally a document editor 270. Document editor 270 is configured for creating, viewing and modifying documents such as text documents, code files, mixed media files (e.g., text and graphics), presentations or the like. Operating system 250 and/or the one or more processors 208 on each device provides a local file management system and executes the various software modules such as content management system client application 200 and document editor 270. A contact directory 290 stores information on the user's contacts, such as name, telephone numbers, company, email addresses, physical address, website URLs, and the like.

Client devices 120 communicate with content management system 100 and document management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Client devices 120 access content management system 100 and document management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100 and document management system 130. Client application 200 includes user interface module 202 that generates an interface to the content accessed by client application 200. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as document editor 270, when client application 200 is not in communication with content management system 100. Content access module 206 manages updates to local content 204 and communicates with content management system 100 to synchronize content modified by client device 120 with content maintained on content management system 100. Client application 200 may take various forms, such as a stand-alone application, an application plug-in, or a browser extension.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Content Management System

Figure 3:
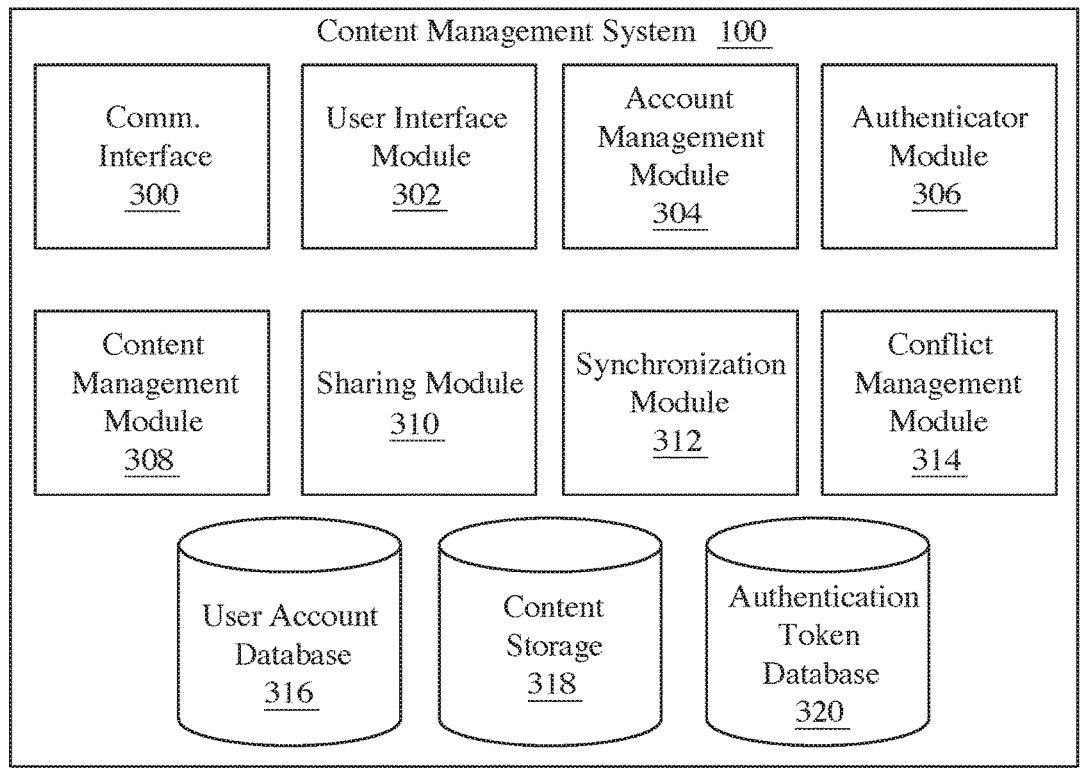
FIG. 3 is a block diagram of the content management system in accordance with an exemplary embodiment.

FIG. 3 shows a block diagram of the content management system 100 according to one embodiment. To facilitate the various content management services, a user can create an account with content management system 100. The account information can be created and maintained in user account database 316. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with a userID and a user name. For purposes of convenience, references herein to information such as documents or other data being "associated" with a user are understood to mean an association between a document and either of the above forms of user identifier for the user. Similarly, data processing operations on documents and users are understood to be operations performed on corresponding identifiers such as documentID and userIDs. For example, a user may be associated with a document by storing the information linking the userID and the documentID in a table, file, or other storage formats. For example, a database table organized by documentIDs can include a column listing the userID of each user associated with the document. As another example, for each userID, a file can list a set of documentIDs associated with the user. As another example, a single file can list key values pairs such as <userID, documentID> representing the association between an individual user and a document. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used;

content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content, such as documents, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 318. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then use a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable method, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API). Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

Content management system 100 includes a sharing module 310 for sharing content publicly or privately. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In some embodiments, content management system 100 includes a content management module 308 for maintaining a content directory that identifies the location of each content item in content storage 318, and allows client applications to request access to content items in the storage 318. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also be configured to remove user account identifiers from a content entry to restrict a user account's access to the content item.

To share content publicly, sharing module 310 generates a custom network address, such as a URL, which allows any web browser to access the content in content management system 100 without any authentication. The sharing module 310 includes content identification data in the generated URL, which can later be used by content management system 100 to identify properly and return the requested content item. For example, sharing module 310 can be configured to include the user account identifier and the content path in the generated URL. The content identification data included in the URL can be transmitted to content management system 100 by a client device to access the content item. In addition to generating the URL, sharing module 310 can also be configured to record that a URL to the content item has been created. In some embodiments, the content entry associated with a content item can include a URL flag indicating whether a URL to the content item has been created.

Document Management System

Figure 4:
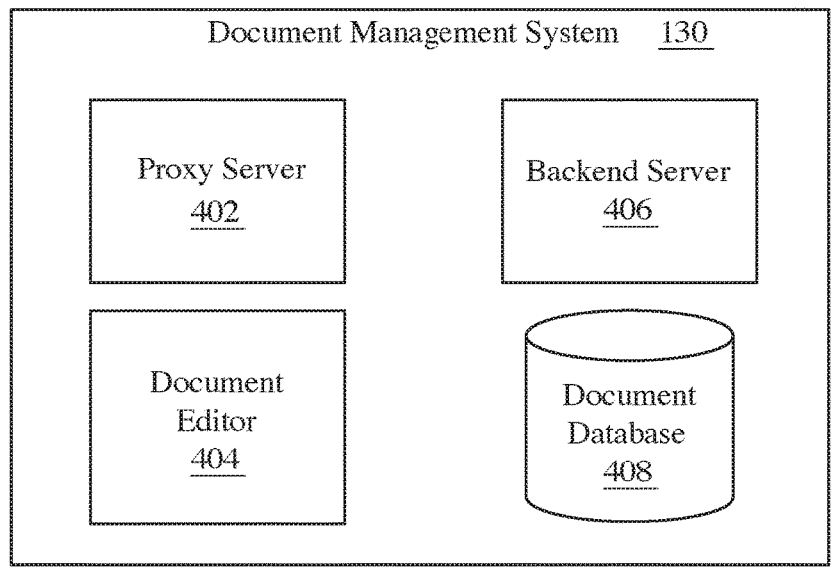
FIG. 4 is a block diagram of the document management system in accordance with an exemplary embodiment.

FIG. 4 shows a block diagram of the document management system 130, according to one embodiment. Like other content items, documents may be shared and synchronized with multiple users and client devices 120, using sharing 310 and synchronization 312 modules of content management system 100. Users operate client devices 120 to create and edit documents, and to share documents with other users of client devices 120. Changes to a document by one client device 120 are propagated to other client devices 120 of users associated with that document.

In the embodiment of FIG. 1, document management system 130 is shown as separate from content management system 100, and can communicate with it to obtain its services. In other embodiments, document management system 130 is a subsystem of the component of content management system 100 that provides sharing and collaboration services for various types of content items. User account database 316 and authentication token database 320 from content management system 100 are used for accessing document management system 130 described herein.

Document management system 130 includes various servers for managing access and edits to documents. Document management system includes proxy server 402, document editor 404, and backend server 406. Proxy server 402 is responsible for handling requests from client applications 200 and passing those requests to the document editor 404. Document editor 404 manage application level requests for client applications 200 for editing and creating documents, and selectively interacting with backend servers 406 for processing lower level processing tasks on documents, and interfacing with documents database 408 as needed.

Client application 200 sends a request relating to a document to proxy server 402. Generally, a request indicates the userID ("UID") of the user, and the documentID ("NID") of the document, and additional contextual information as appropriate, such as the text of the document. When proxy server 402 receives the request, the proxy server 402 passes the request to the document editor 404. Proxy server 402 also returns a reference to the identified documents server 404 to client application 200, so the client application can directly communicate with the document editor 404 for future requests. In an alternative embodiment, client application 200 initially communicates directly with a specific document 404 assigned to the userID.

When a documents editor 404 receives a request, it determines whether the request can be executed directly or by a backend server 406. When the request adds, edits, or otherwise modifies a document the request is handled by the document editor 404. If the request is directed to a database or index inquiry, the request is executed by a backend server 406. For example, a request from client device 120 to view a document or obtain a list of documents responsive to a search term does not modify documents and is processed by backend server 406.

Content management system 100 and document management system 130 may be implemented using a single computer, or a network of computers, including cloud-based computer implementations. For the purposes of this disclosure, a computer is a device having one or more processors, memory, storage devices, and networking resources. The computers are preferably server class computers including one or more high-performance CPUs and 1G or more of main memory, as well as 500 GB to 2 Tb of computer readable, persistent storage, and running an operating system such as LINUX or variants thereof. The operations of content management system 100 and document management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, documents servers, failover servers, network management tools and so forth are not shown so as not to obscure the features of the system. Finally, the functions and operations of content management system 100 and document management system 130 are sufficiently complex as to require implementation on a computer system, and cannot be performed in the human mind simply by mental steps.

Refer Command

Figure 5A:
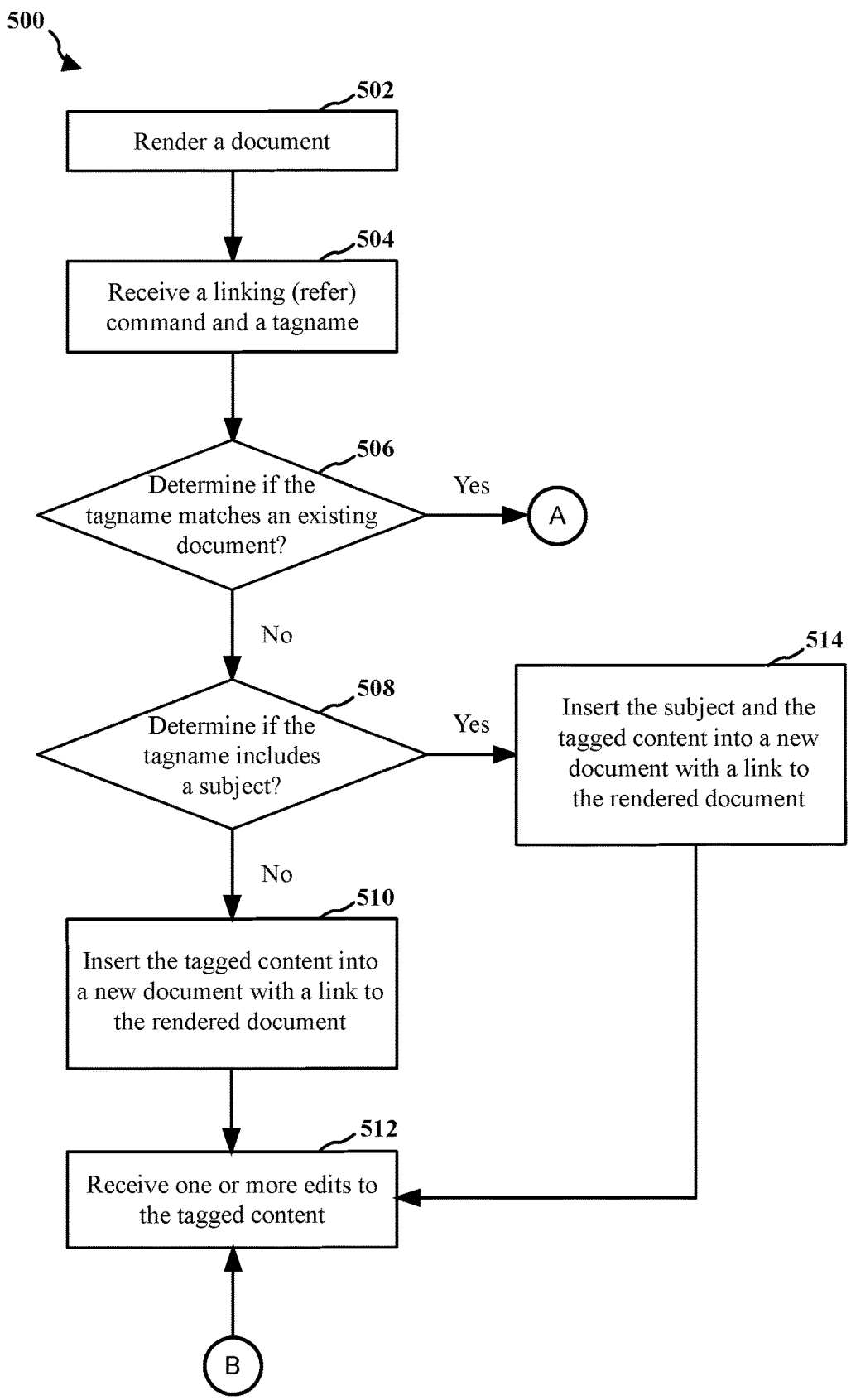
FIGS. 5A and 5B is a flowchart for a method for executing a refer command to copy content from a rendered document into another document in accordance with an exemplary embodiment.
Figure 5B:
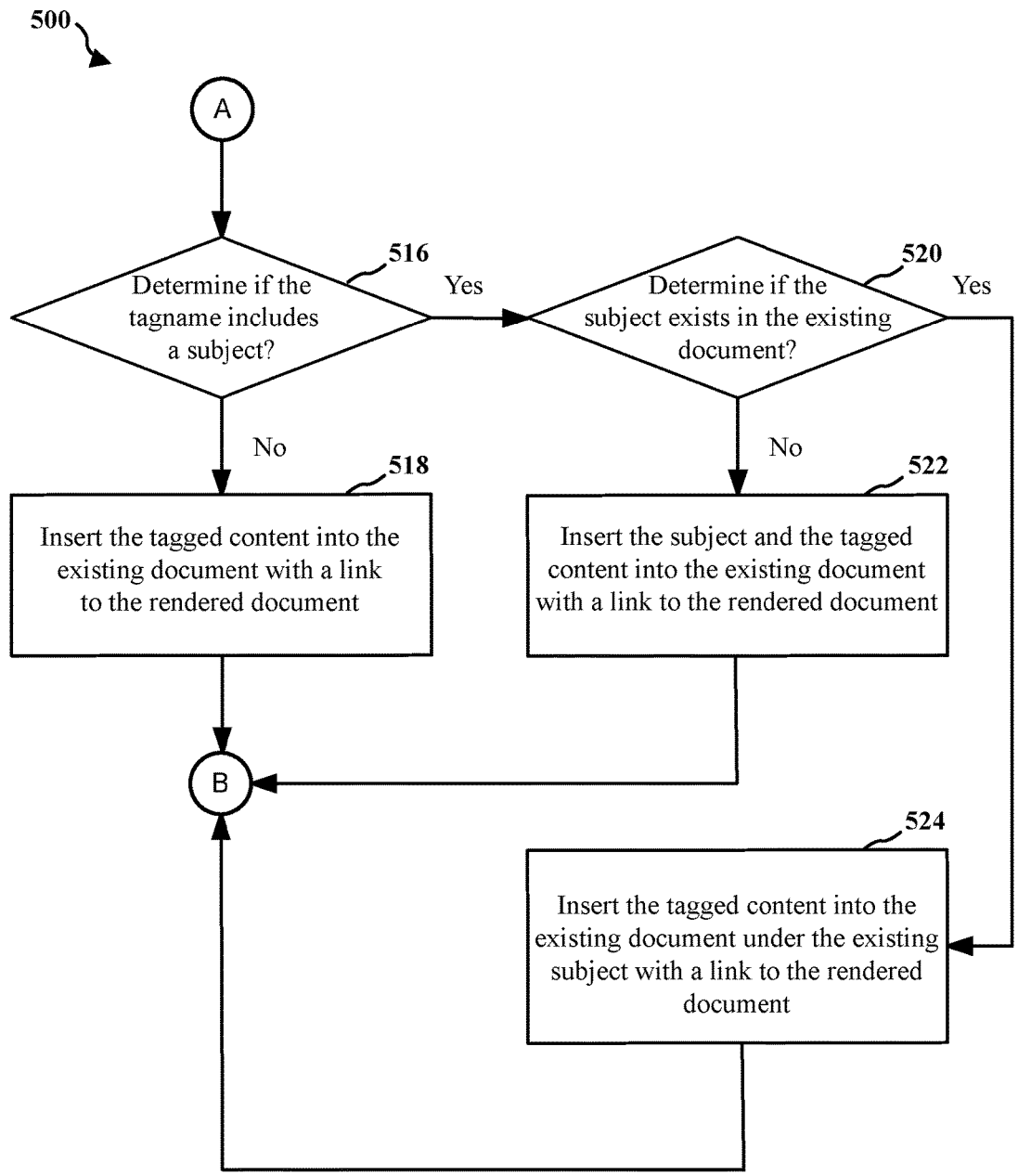

Referring to FIGS. 5A and 5B, a flowchart for a method for executing a refer command to copy content from a rendered document into another document in accordance with an exemplary embodiment is illustrated. Exemplary method 500 is provided by way of example, as there are a variety of ways to carry out the method. Method 500 described below can be carried out using the configurations illustrated in FIGS. 1-4 by way of example, and various elements of these figures are referenced in explaining exemplary method 500. Each block shown in FIGS. 5A and 5B represents one or more processes, methods or subroutines, carried out in exemplary method 500. Exemplary method 500 can begin at block 502.

Figure 6A:
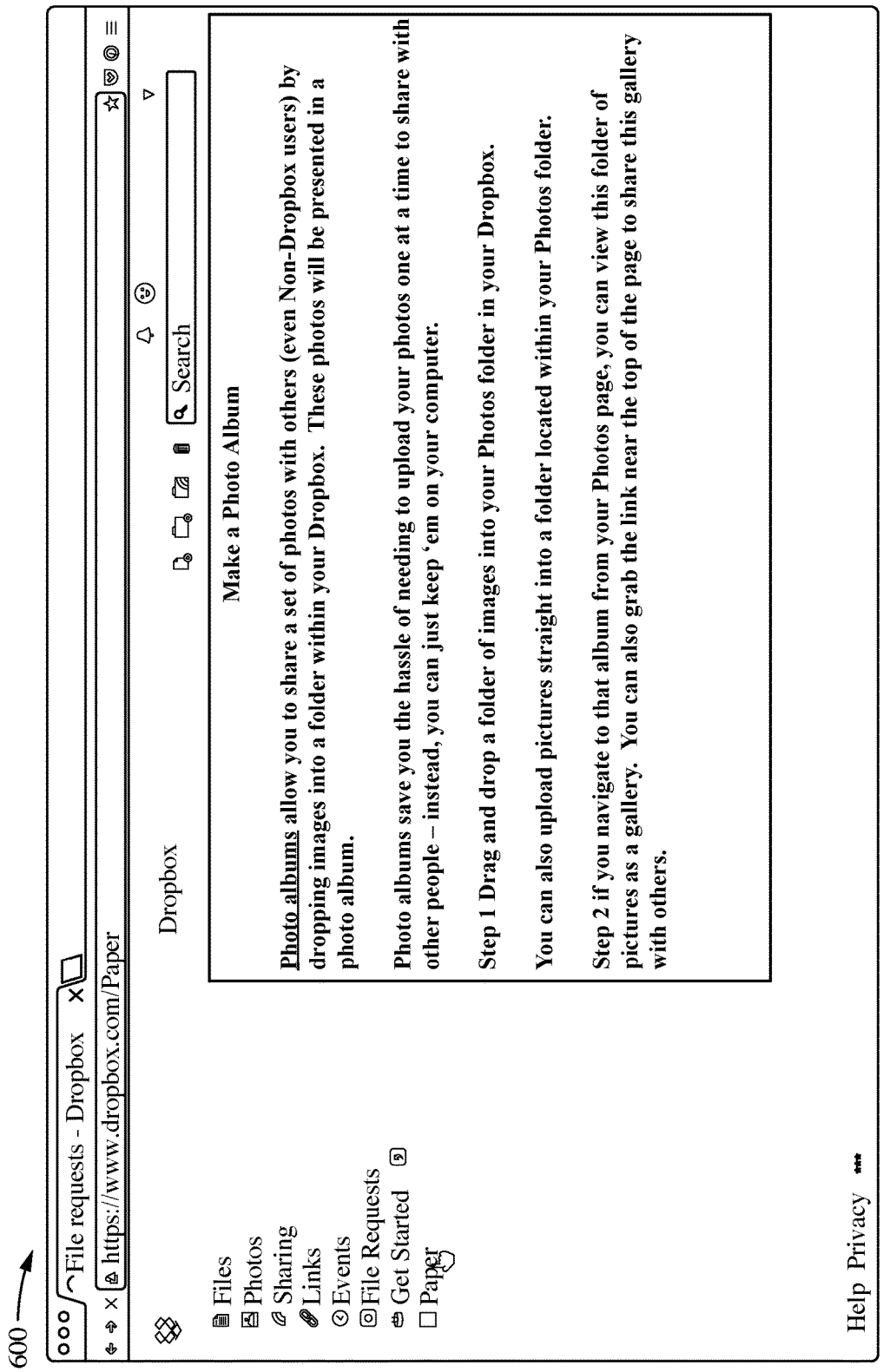
FIG. 6A is a user interface rendering a source document in accordance with an exemplary embodiment.

At block 502, render a document. For example, a processor 208, a web browser 260, a document editor 270, a document editor 404, and/or the client application 200 of the client device 120 renders a document on the display 210 of client device 120. FIG. 6A shows a document entitled "Make a Photo Album," being rendered in a user interface 600 on a display 210 of a client device 120. After rendering the document, the method 500 can proceed to block 504.

Figure 6B:
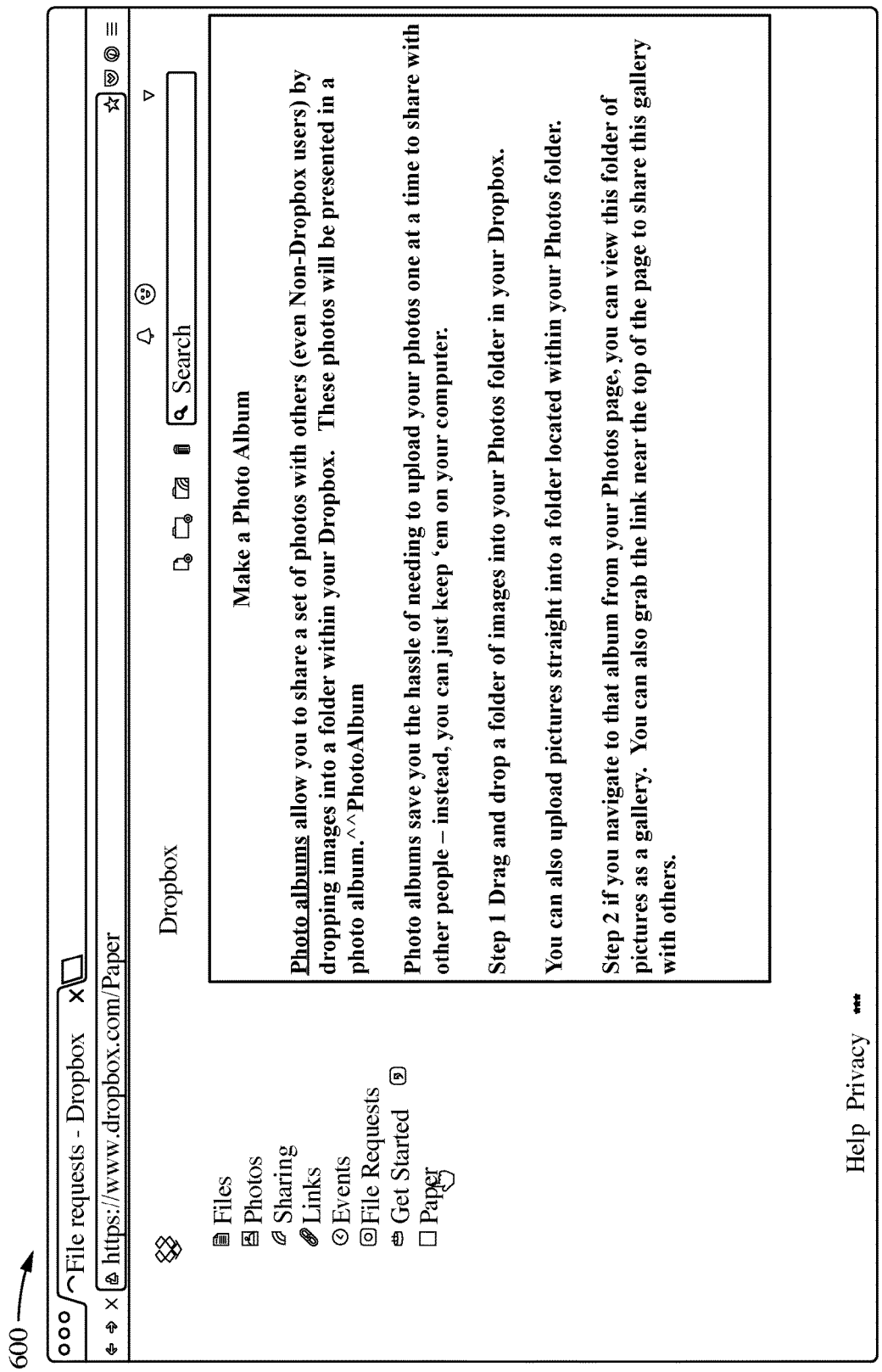
FIG. 6B is a user interface rendering a source document having a refer command in accordance with an exemplary embodiment.
Figure 6C:
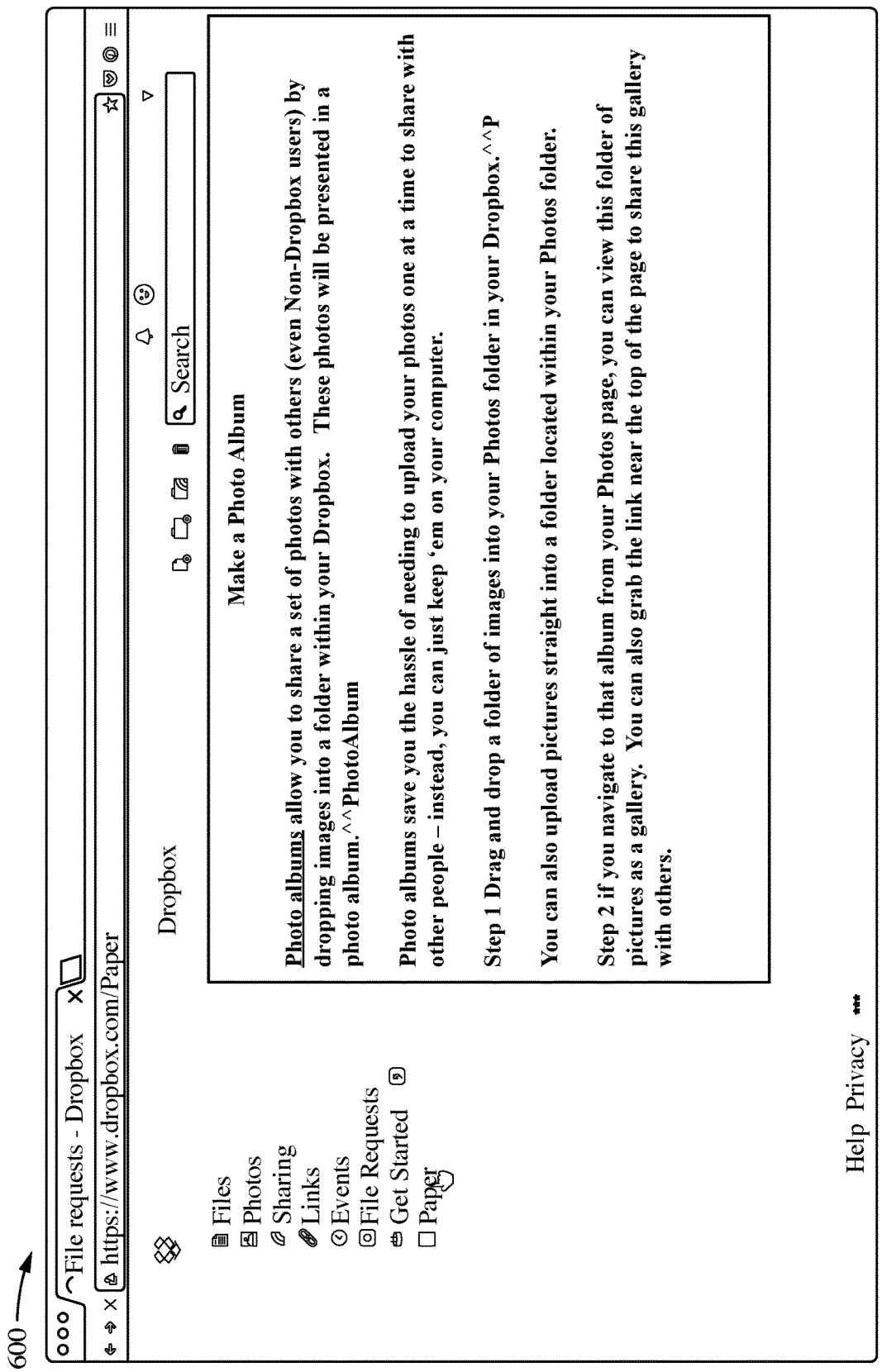
FIG. 6C is a user interface rendering a source document having a partial refer command in accordance with an exemplary embodiment.
Figure 6D:
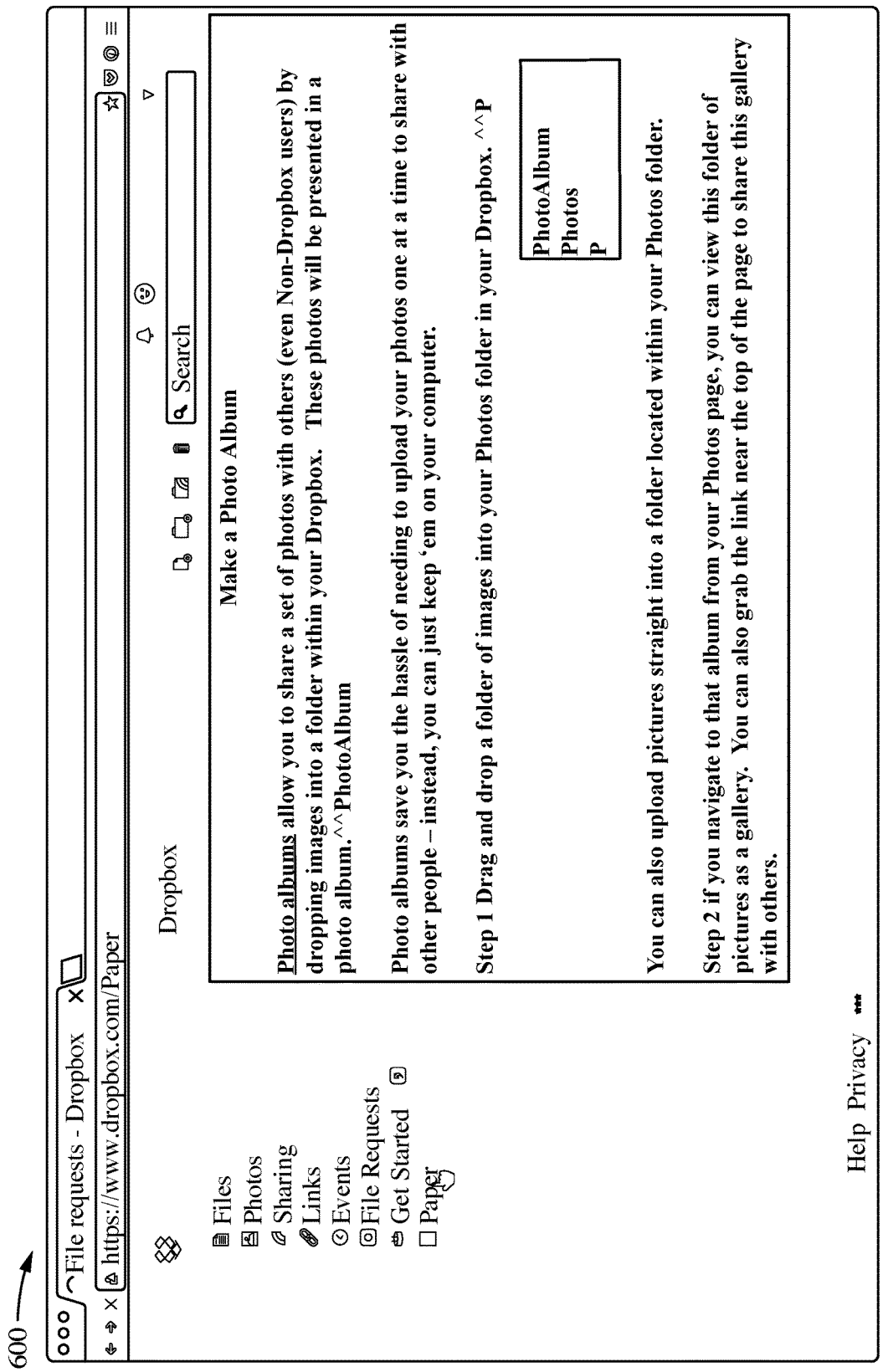
FIG. 6D is a user interface rendering a source document with a list of potential file names in accordance with an exemplary embodiment.
Figure 6E:
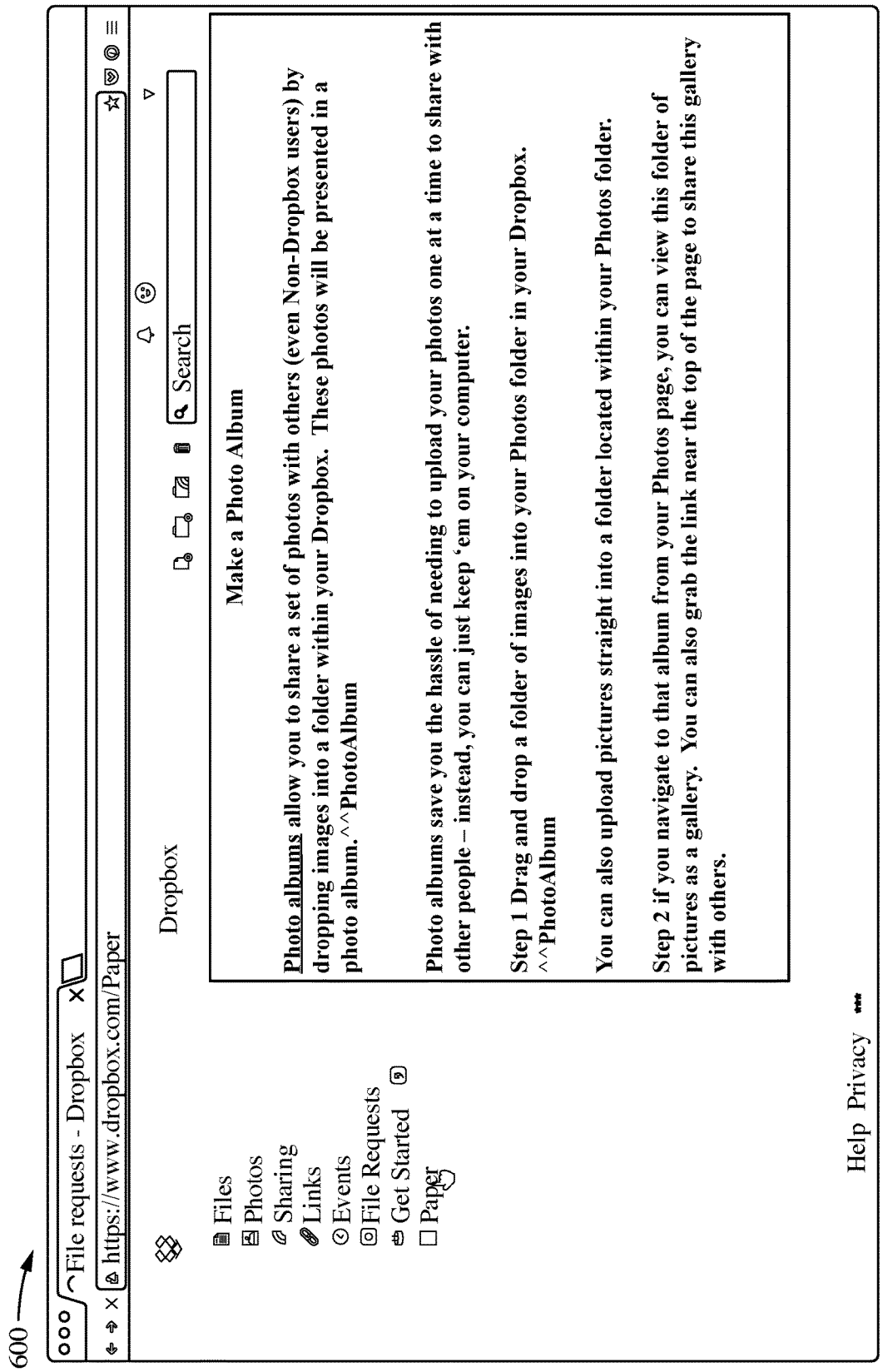
FIG. 6E is a user interface rendering a source document having two refer commands in accordance with an exemplary embodiment.

At block 504, receive a linking command, and more specifically a refer command, and a tagname. For example, the processor 208, web browser 260, document editor 270, document editor 404, and/or client application 200 of the client device 120 receives a refer command and a tagname within the rendered document and the refer command being associated with content in the rendered document. FIG. 6B shows the first paragraph of the rendered Make a Photo Album document being tagged to be copied into a new document entitled "PhotoAlbum." The "^^" is an indicator or trigger for the refer command. One of ordinary skill in the art can appreciate that other text or symbols can be used in place of the "^^". The text entered after the refer command is the tagname. In this example, the tagname is PhotoAlbum. The tagname is the name of the document or file that the tagged content will be copied into. The tagname can be for a new document or an existing document. For new documents, the user enters the full name of the new document. FIG. 6C shows a second paragraph of the Make a Photo Album document being tagged to be inserted into the existing PhotoAlbum document. In this example, the user starts to enter the tagname of PhotoAlbum by typing 'P" In response to receiving the start of a tagname, the user can be prompted to select a tagname from a displayed list of potential tagnames for the tagged content as shown in FIG. 6D. For example, in response to the user entering the refer command (e.g., the ^^) and starting to enter the tagname, the processor 208, web browser 260, document editor 270, document editor 404, and/or client application 200 of the client device 120 searches for documents or files that are associated with the user and can cause the rendering of the list of potential tagnames based on the entered letter (e.g., "P") or letters if more than one letter is entered. The user can continue typing the tagname or select a tagname from the displayed list of potential tagnames. FIG. 6E shows the Make a Photo Album document having two tagged paragraphs. For example, in response to the user entering the full tagname or the user selecting a document from the displayed list of potential tagnames, the processor 208, web browser 260, document editor 270, document editor 404, and/or client application 200 of the client device 120 displays the refer command and tagname in the rendered document.

In one or more embodiments, the refer command can be a menu option that is selected from a menu after the user selects or highlights the desired content to be tagged. For example, the user can highlight the first paragraph, right click on the mouse, select the refer command from a displayed menu, and enters a tagname in response to a prompt requesting the tagname. An applicable method is explained below with respect to the send to file command.

Figure 6F:
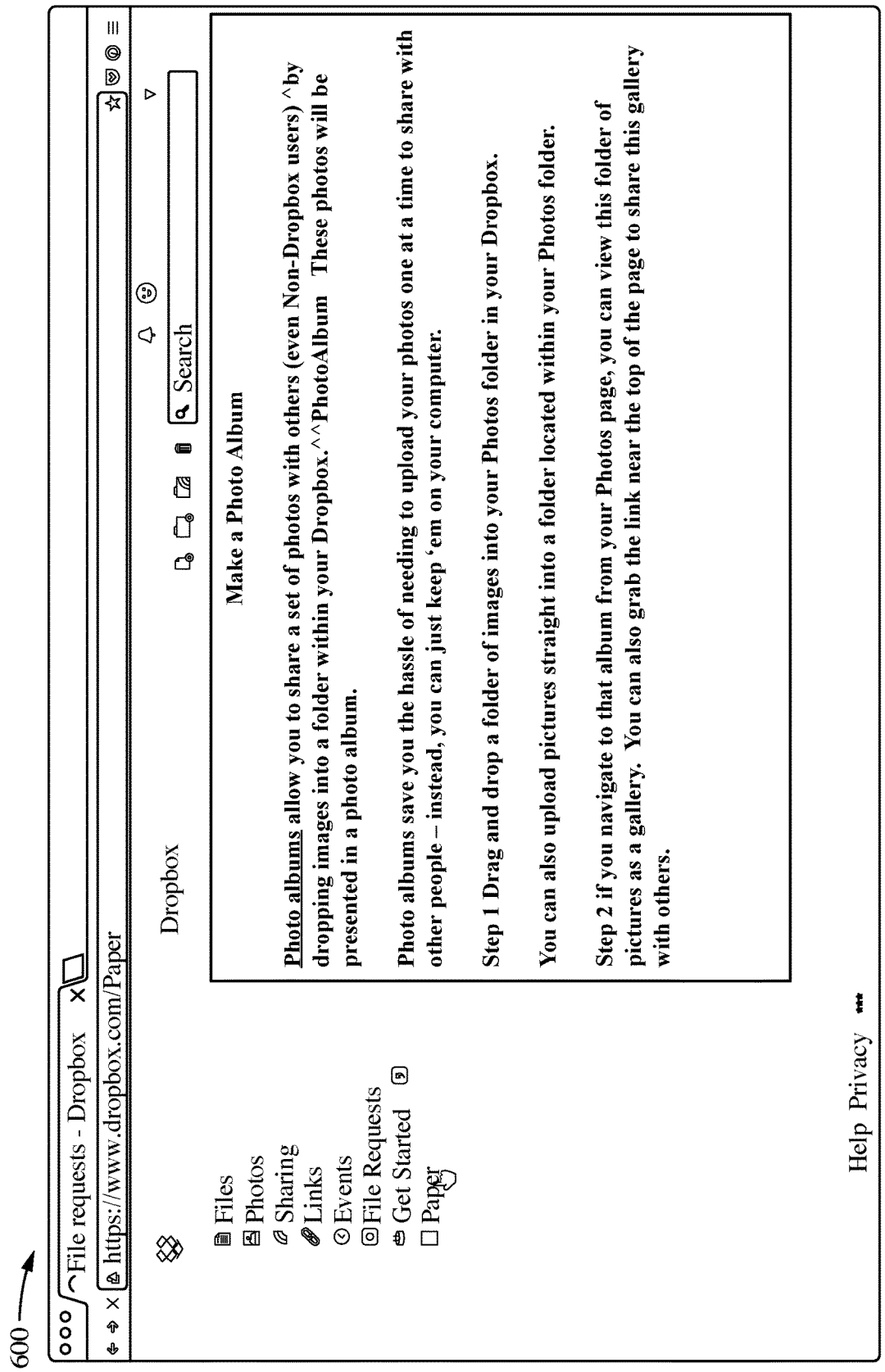
FIG. 6F is a user interface rendering a source document with a refer command having a starting indicator and an ending indicator in accordance with an exemplary embodiment.

The refer command and tagname can be entered anywhere within or after the paragraph that is to be tagged. In one or more embodiments, the refer command can include a starting indicator and ending indicator to select a sentence or part of a sentence. FIG. 6F shows a refer command having a starting indicator, the "^", and an ending indicator, the "^^" with the tagname, "PhotoAlbum." In this example, the user tagged "by dropping images into a folder within your Dropbox," which is a portion of the first sentence, to be inserted into the PhotoAlbum document. One of ordinary skill in the art can appreciate that other text, symbols or gestures can be used in place of the starting indicator "^" and the ending indicator "^^". In one or more embodiments, tagged content can tag the sentence associated with a refer command rather than the paragraph. To tag a sentence, a user can enter a starting indicator (e.g., "^") before the first word in the sentence and insert an ending indicator (e.g., "^^") at the end of the sentence with a tagname. For example, to tag the first sentence, the first sentence would be: "^Photoalbums allow you to share a set of photos with others (even Non-Dropbox users) by dropping images into a folder within your Dropbox.^^PhotoAlbum". If a user selects the desired content and uses a refer icon (e.g., "^ ^^") from a menu a starting indicator and an ending indicator can be inserted into the rendered document to show the selected content.

Returning to FIG. 5A, after receiving the refer command and tagname, the method 500 can proceed to block 506. At block 506, determine if the tagname matches an existing document. For example, the processor 208, web browser 260, document editor 270, document editor 404, and/or client application 200 of the client device 120 determines whether the tagname matches an existing document by comparing the tagname with at least one existing document, e.g., documents or files that are associated with the user. The comparison determines whether the tagname is for an existing document or a new document. If the tagname is for a new document, the method can proceed to block 508. If the tagname is for an existing document, the method 500 can proceed to block 516 of FIG. 5B.

Figure 6G:
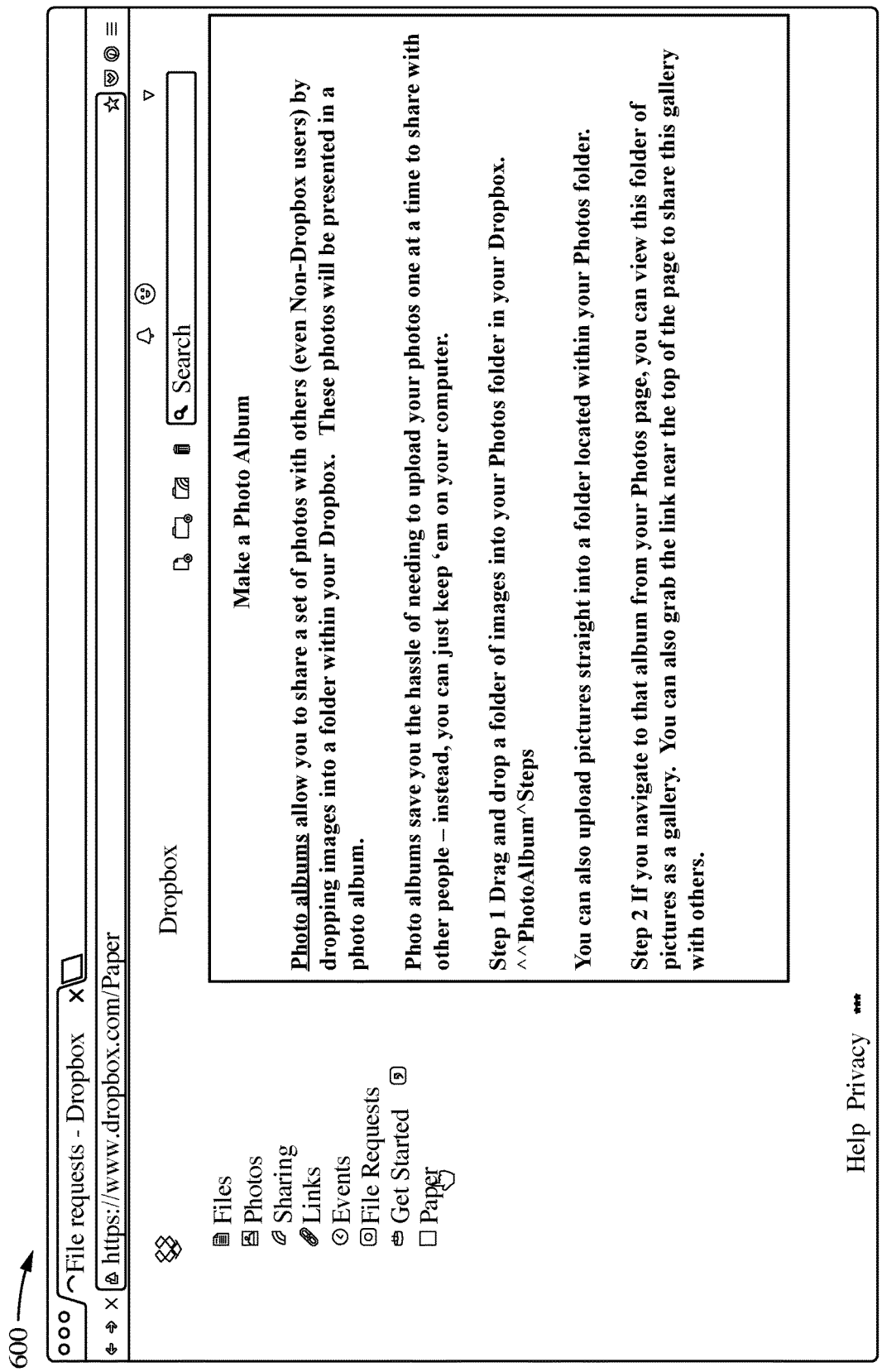
FIG. 6G is a user interface rendering a source document having a refer command with a subject in accordance with an exemplary embodiment.

At block 508, determine if the tagname includes a subject. For example, the processor 208, web browser 260, document editor 270, document editor 404, and/or client application 200 of the client device 120 determines whether the tagname includes a subject. FIG. 6B shows the Make a Photo Album document having a tagged paragraph without a subject. FIG. 6G shows the Make a Photo Album document having a tagged paragraph with a subject of "Steps" which is identified by "^Steps". One of ordinary skill in the art can appreciate that other text or symbols can be used in place of the "^" as the subject indicator. In this example, the user wants to copy the content, "Step 1 Drag and drop a folder of images into your Photos folder in your Dropbox." into the PhotoAlbum document with the tagged content being inserted under the subject Steps. If the tagname does not include a subject, the method 500 can proceed to block 510. If the tagname includes a subject, the method 500 can proceed to block 514.

Figure 6H:
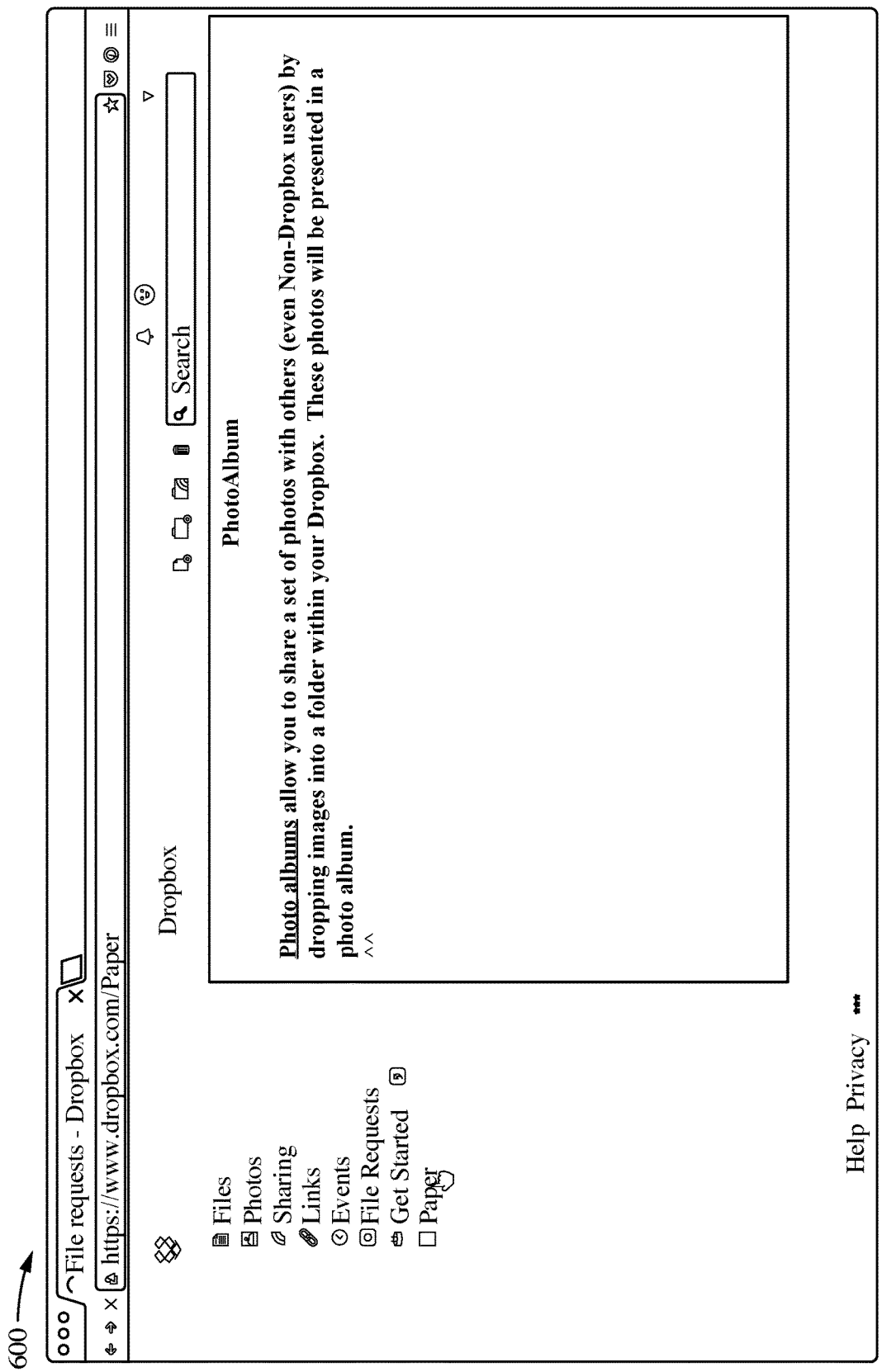
FIG. 6H is a user interface rendering a target document having tagged content in accordance with an exemplary embodiment.

At block 510, insert the tagged content into a new document with a link to the rendered document. For example, the processor 208, web browser 260, document editor 270, document editor 404, and/or client application 200 of the client device 120 creates a new document and inserts the tagged content (e.g., the content associated with the refer command) into the new document with a link to the rendered document. The new document would have the tagname as a file name for the new document. FIG. 6H shows a new document or target document, e.g., PhotoAlbum, having a tagged paragraph that was tagged in FIG. 6B. As shown, the tagged paragraphs include a link, e.g., ^^, to the rendered document or source document from which the content was copied from. One of ordinary skill in the art can appreciate that other text or symbols can be used in place of the ^^ as the link. The link is a hyperlink to the source document that the inserted content or tagged content was copied from. In this example, the link is to the Making a Photo Album document. After inserting the tagged content into the new document with a link to the rendered document, the method 500 can proceed to block 512.

At block 512, receive one or more edits to the content. For example, the processor 208, web browser 260, document editor 270, document editor 404, and/or client application 200 of the client device 120 receives one or more edits to the inserted content. In this example, the user can access the new document, e.g., PhotoAlbum, and edit the content which was copied from one or more other documents, e.g., the Making a Photo Album document. The edits can include new content, e.g., text, which is added to the new document. As further explained below, tagged content can be added to the end of the target document or below existing content under a subject. In one or more other embodiments, tagged content can be added to the beginning of the target document or immediately below a subject. The user can re-arrange the ordering of the content by editing or moving the tagged content and/or edited tagged content.

Figure 6I:
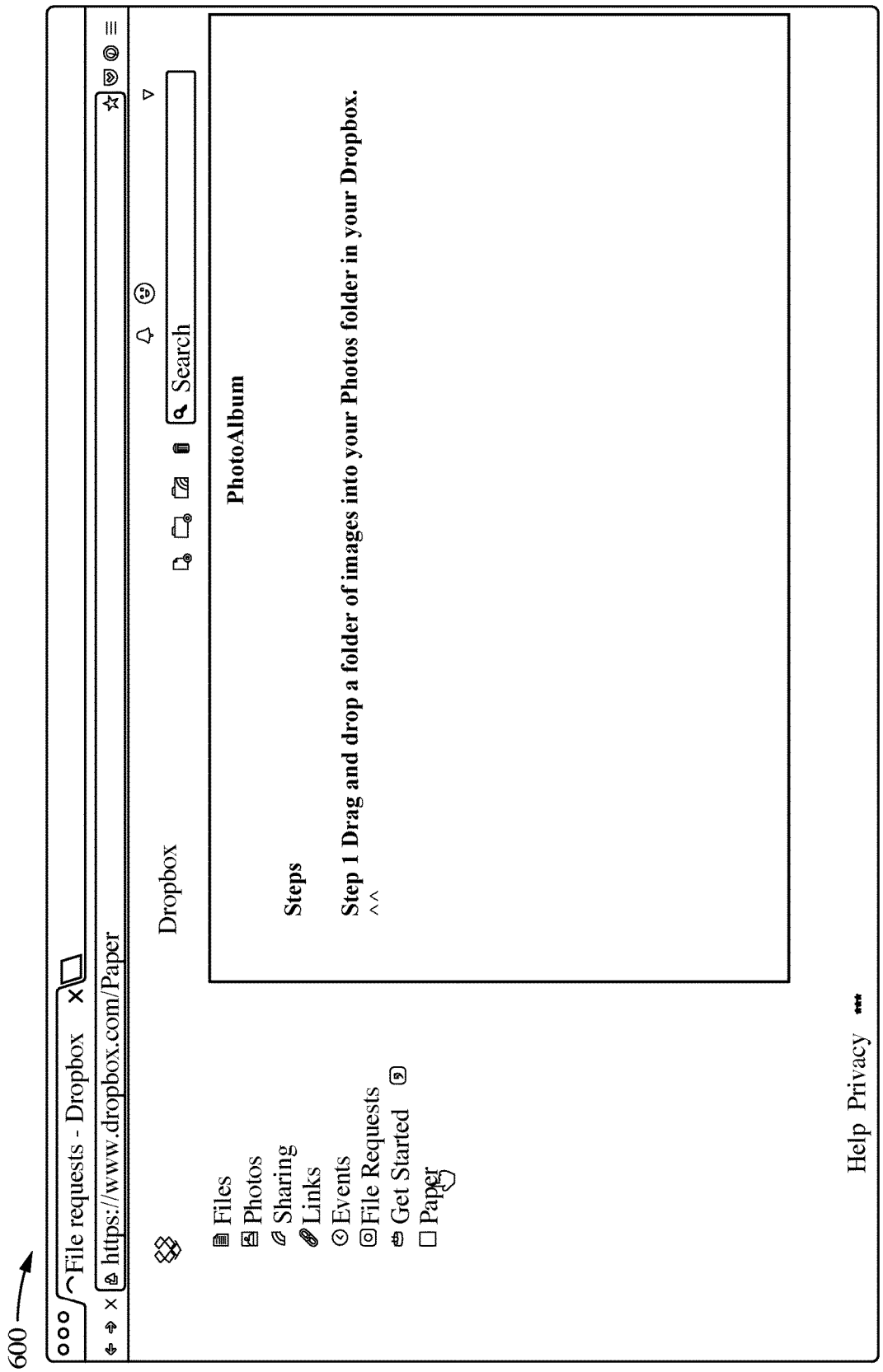
FIG. 6I is a user interface rendering a target document having tagged content with a subject in accordance with an exemplary embodiment.

At block 514, insert the subject and the tagged content into a new document with a link to the rendered document. For example, the processor 208, web browser 260, document editor 270, document editor 404, and/or client application 200 of the client device 120 creates a new document and inserts the subject and the tagged content into the new document with a link to the rendered document. The new document would have the tagname as a file name for the new document. FIG. 6G shows the Make a Photo Album document having a tagged paragraph with a subject, "Steps." FIG. 6I shows the new document or target document, e.g., PhotoAlbum, having the tagged paragraph inserted under the subject with the link to the rendered document or source document, e.g., Making a Photo Album. More specifically, "Step 1 Drag and drop a folder of images into your Photos folder in your Dropbox." is copied into the PhotoAlbum document with the tagged content being inserted under the subject Steps. After inserting the subject and tagged content into the new document with a link to the rendered document, the method 500 can proceed to block 512.

Figure 6J:
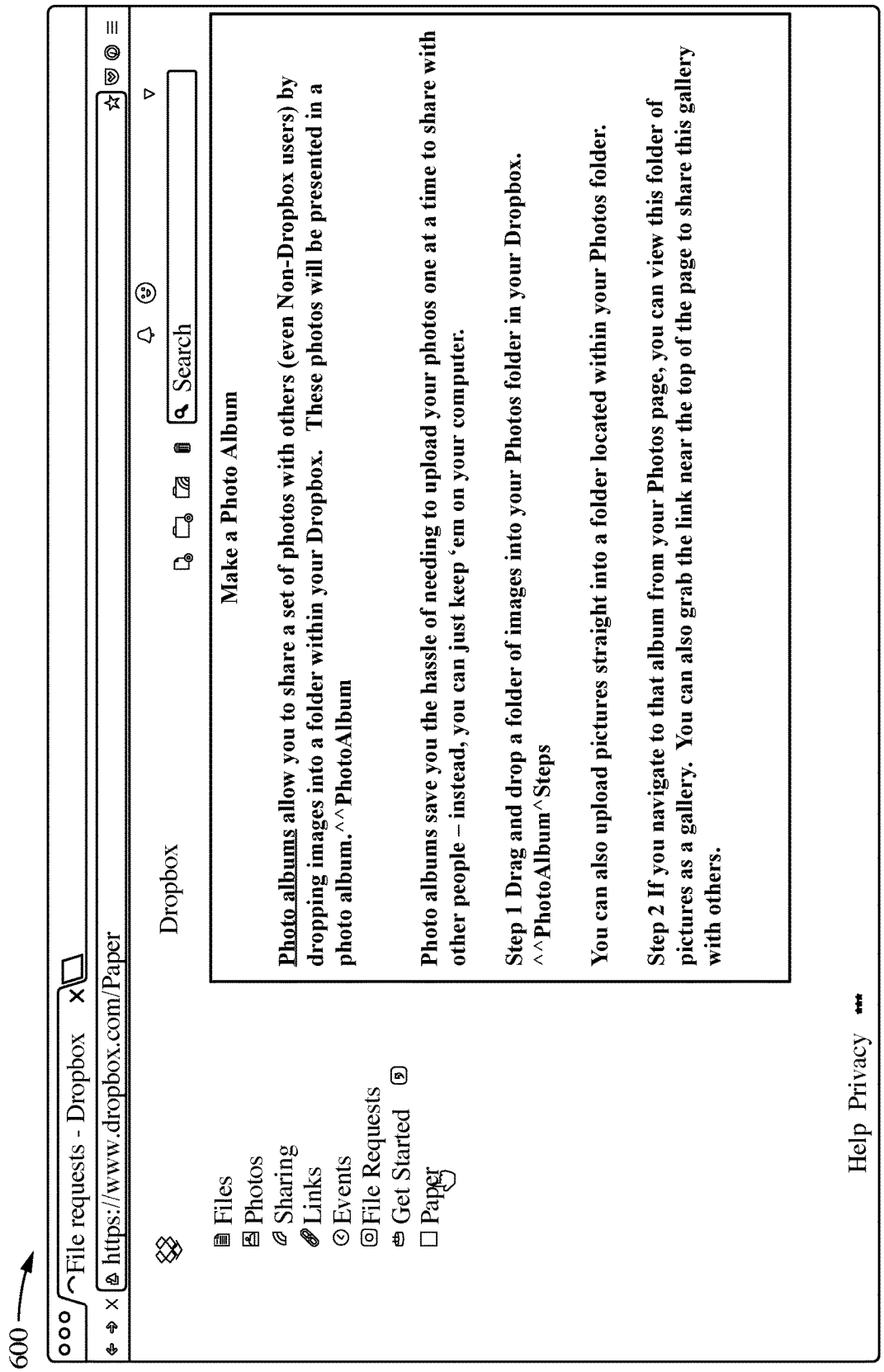
FIG. 6J is a user interface rendering a source document having tagged content without a subject and tagged content with a subject in accordance with an exemplary embodiment.

At block 516, determine if the tagname includes a subject. For example, the processor 208, web browser 260, document editor 270, document editor 404, and/or client application 200 of the client device 120 determines whether the tagname includes a subject. FIG. 6E shows the Make a Photo Album document having two tagged paragraphs without subjects. FIG. 6J shows the Make a Photo Album document having two tagged paragraphs, one without a subject and one with a subject. Each of the tagged paragraphs are tagged to be added to an existing document. If the tagname for the second tagged paragraph does not include a subject, the method 500 can proceed to block 518. If the tagname for the second tagged paragraph includes a subject, the method 500 can proceed to block 520.

Figure 6K:
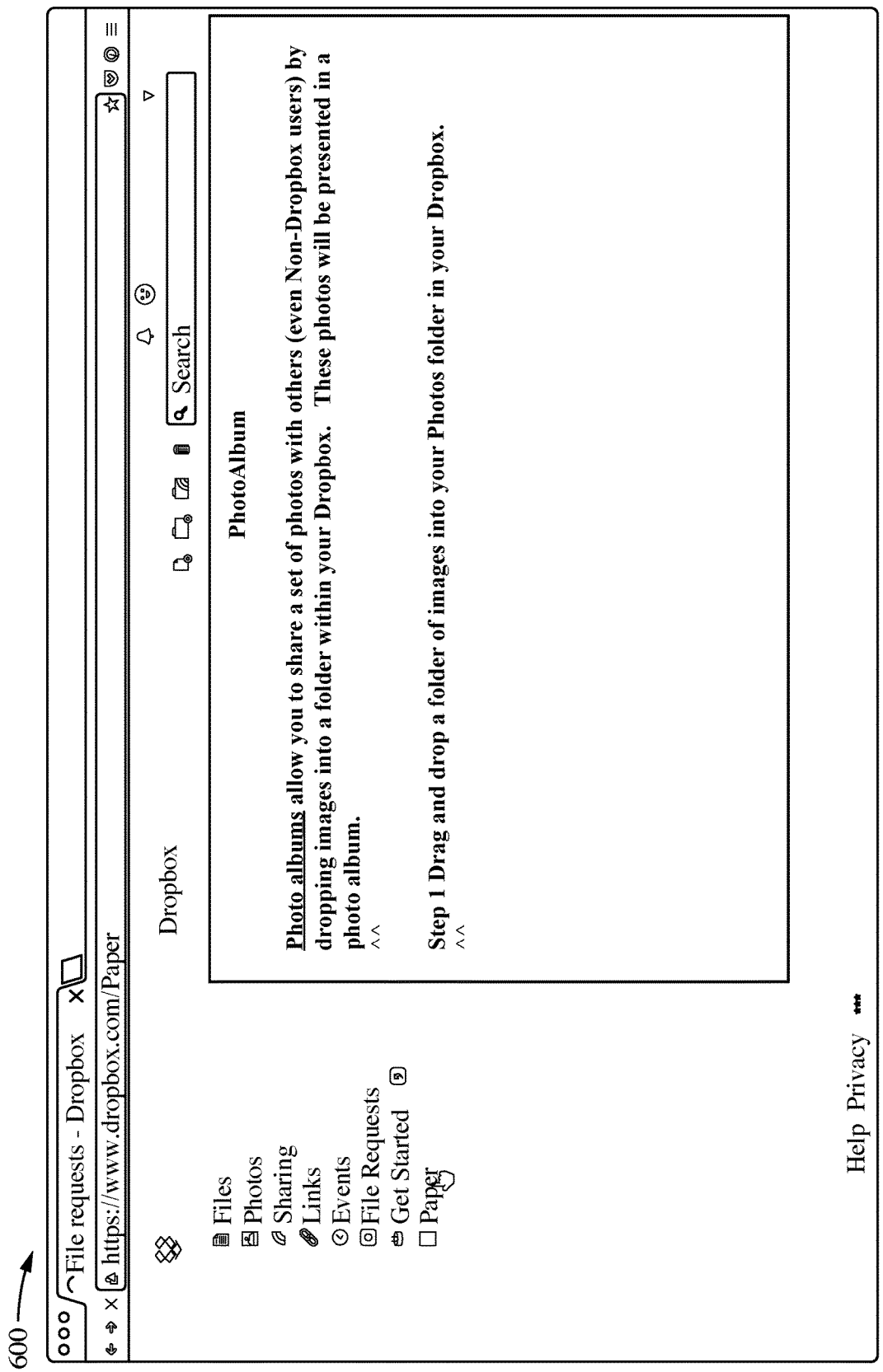
FIG. 6K is a user interface rendering a target document having multiple tagged content in accordance with an exemplary embodiment.

At block 518, insert the tagged content into the existing document with a link to the rendered document. For example, the processor 208, web browser 260, document editor 270, document editor 404, and/or client application 200 of the client device 120 inserts the tagged content into the existing document with a link to the rendered document. FIG. 6K shows an existing document, e.g., PhotoAlbum, having two tagged paragraphs that were tagged in FIG. 6E. As shown, each of the tagged content includes a link, e.g., ^^, to the rendered document or source document from which the content was copied from. The link is a hyperlink to the document that the tagged content was copied from. In this example, each link is to the Making a Photo Album document. After inserting the tagged content into the existing document with a link to the rendered document, the method 500 can proceed to block 512 of FIG. 5A.

At block 520, determine if the subject exists in the existing document. For example, the processor 208, web browser 260, document editor 270, document editor 404, and/or client application 200 of the client device 120 determines whether the subject, e.g., "Steps", exists in the existing document (e.g., PhotoAlbum) as a subject rather than as text. A subject can have a carriage return as the next subsequent character after the subject or a ":" and a carriage return as the next subsequent character after the subject. If the subject of the tagname exists as text with one of text, a space, a period, a question mark or an explanation mark as the next character, the subject can be considered as text and not a subject. If the subject of the tagname exists as a subject in the existing document, the method 500 can proceed to block 524. If the subject of the tagname does not exist as a subject in the existing document, the method 500 can proceed to block 522.

Figure 6L:
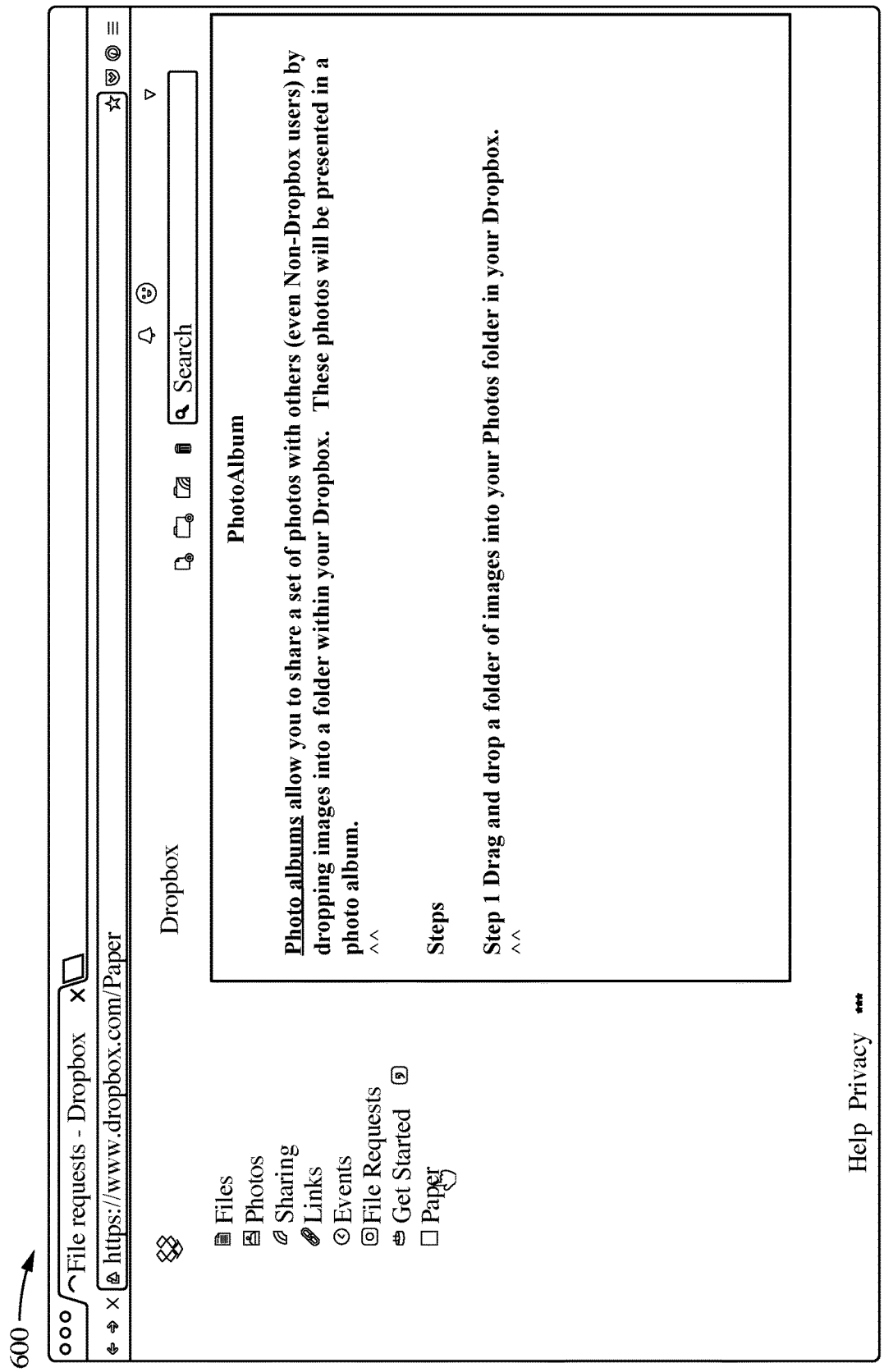
FIG. 6L is a user interface rendering a target document having tagged content without a subject and tagged content with a subject in accordance with an exemplary embodiment.

At block 522, insert the subject and the tagged content into the existing document with a link to the rendered document. For example, the processor 208, web browser 260, document editor 270, document editor 404, and/or client application 200 of the client device 120 inserts the subject and the tagged content into the existing document with a link to the rendered document. FIG. 6L shows an existing document, e.g., PhotoAlbum, having a tagged paragraph, a subject and a tagged paragraph under the subject with links to the source documents from which tagged content was copied from. In this example, the first paragraph was previously copied from the Making a Photo Album and the subject "Steps" and "Step 1 Drag and drop a folder of images into your Photos folder in your Dropbox." inserted into the existing document or target document, e.g., PhotoAlbum, with a link to the rendered document or source document from which the tagged content was copied from. After inserting the subject and the tagged content into the existing document with a link to the rendered document, the method 500 can proceed to block 512 of FIG. 5A.

Figure 6M:
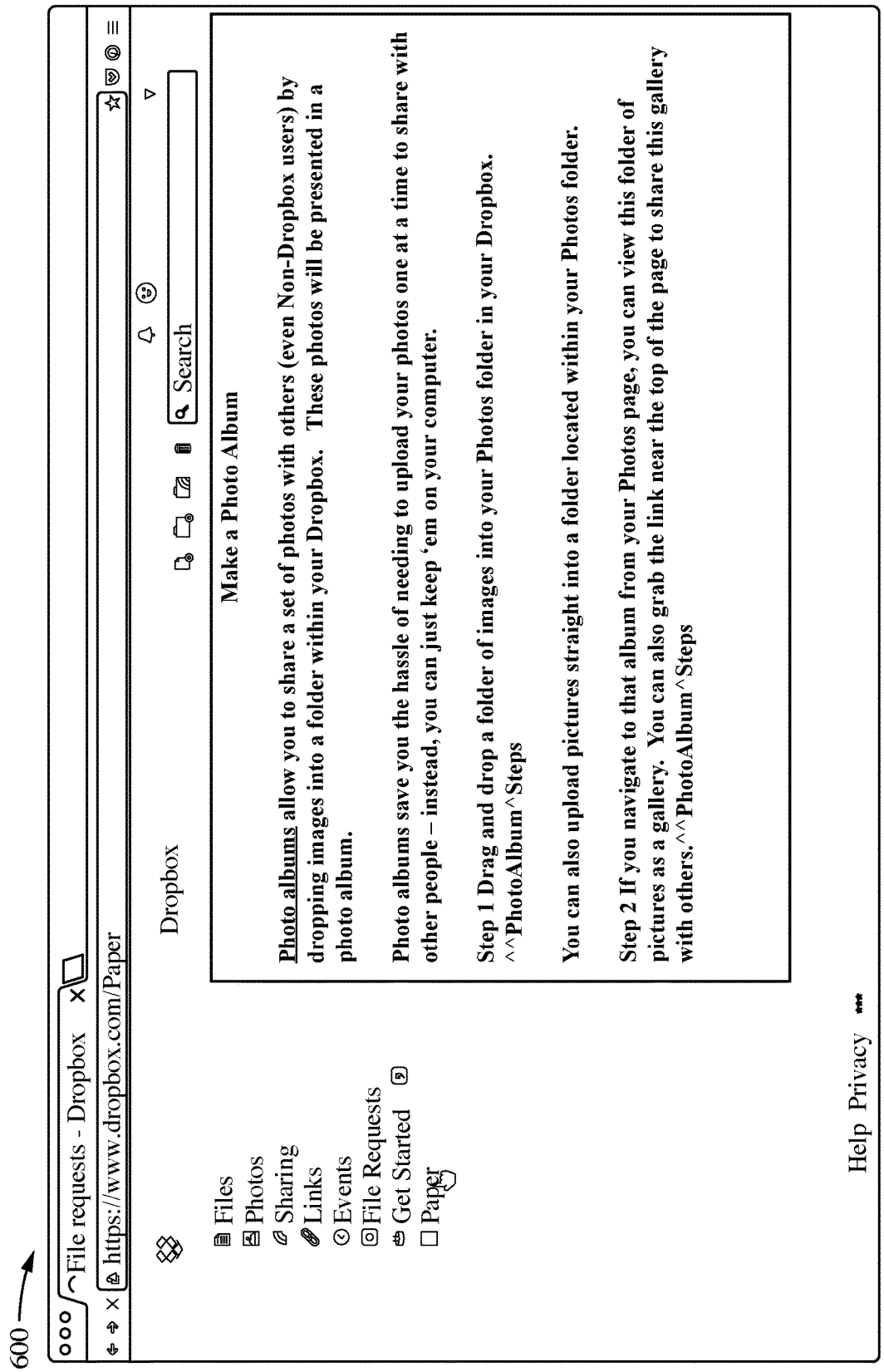
FIG. 6M is a user interface rendering a source document having two refer commands with each having a subject in accordance with an exemplary embodiment.
Figure 6N:
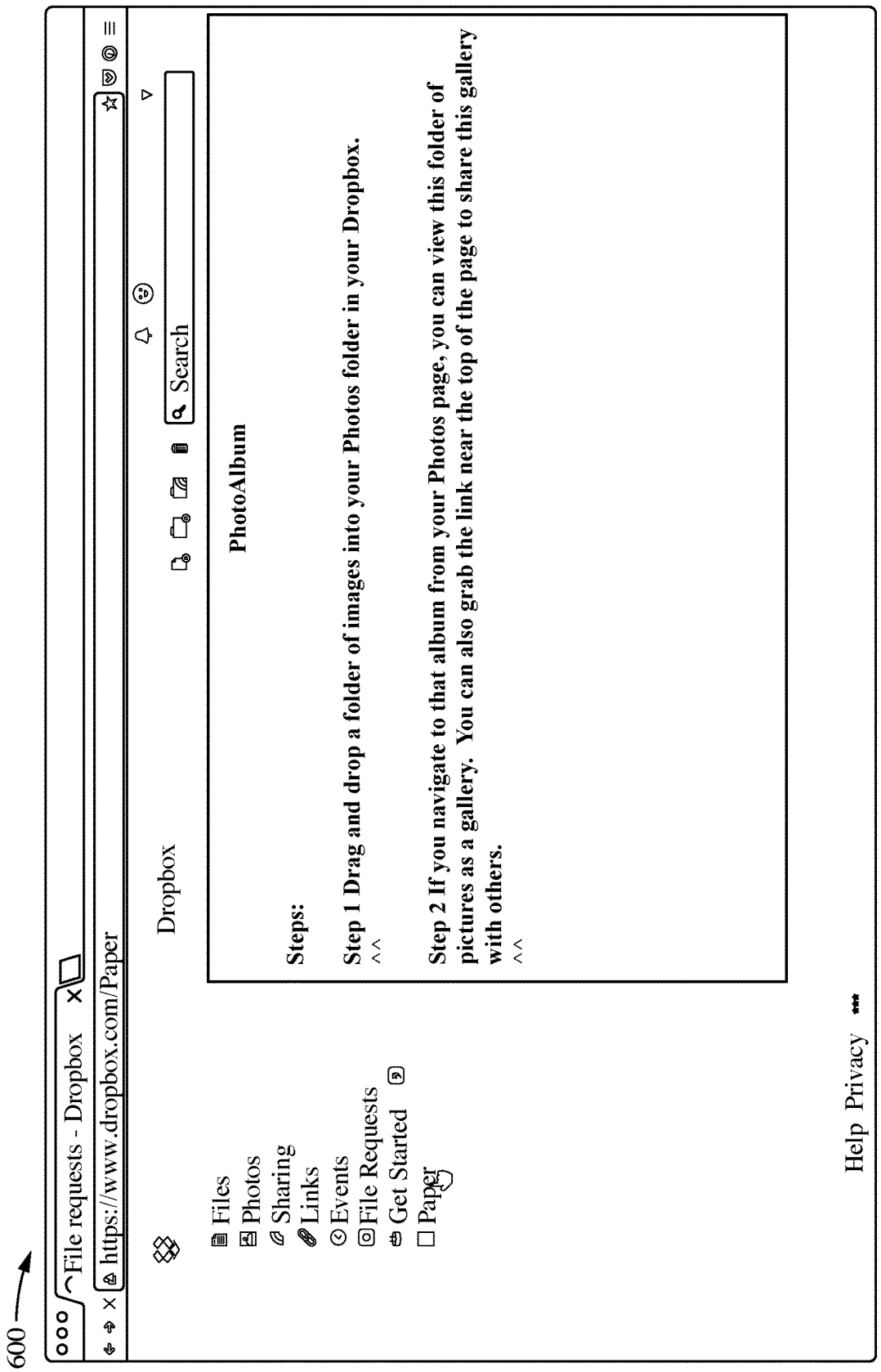
FIG. 6N is a user interface rendering a target document having multiple tagged content under a subject in accordance with an exemplary embodiment.

At block 524, insert the tagged content into the existing document under the existing subject with a link to the rendered document. For example, the processor 208, web browser 260, document editor 270, document editor 404, and/or client application 200 of the client device 120 inserts the tagged content into the existing document under the existing subject with a link to the rendered document. FIG. 6M shows the source document, Making a Photo Album, having two tagged paragraphs with subjects. In this example, the second tagged paragraph is going to be added to the existing document PhotoAlbum under the existing subject Steps. FIG. 6N shows the existing document or target document, having the two tagged paragraphs under the subject Steps, with a link to the source document, Making a Photo Album. After inserting the subject and the tagged content into the existing document with a link to the rendered document, the method 500 can proceed to block 512 of FIG. 5A.

The refer command can be used to create a target document having links to existing source documents. For example, a user may have several documents that cover different aspects of a single topic. By using the refer command, the user can generate a new document or supplement an existing document that includes content from one or more source documents with links to the corresponding source documents.

Figure 7:
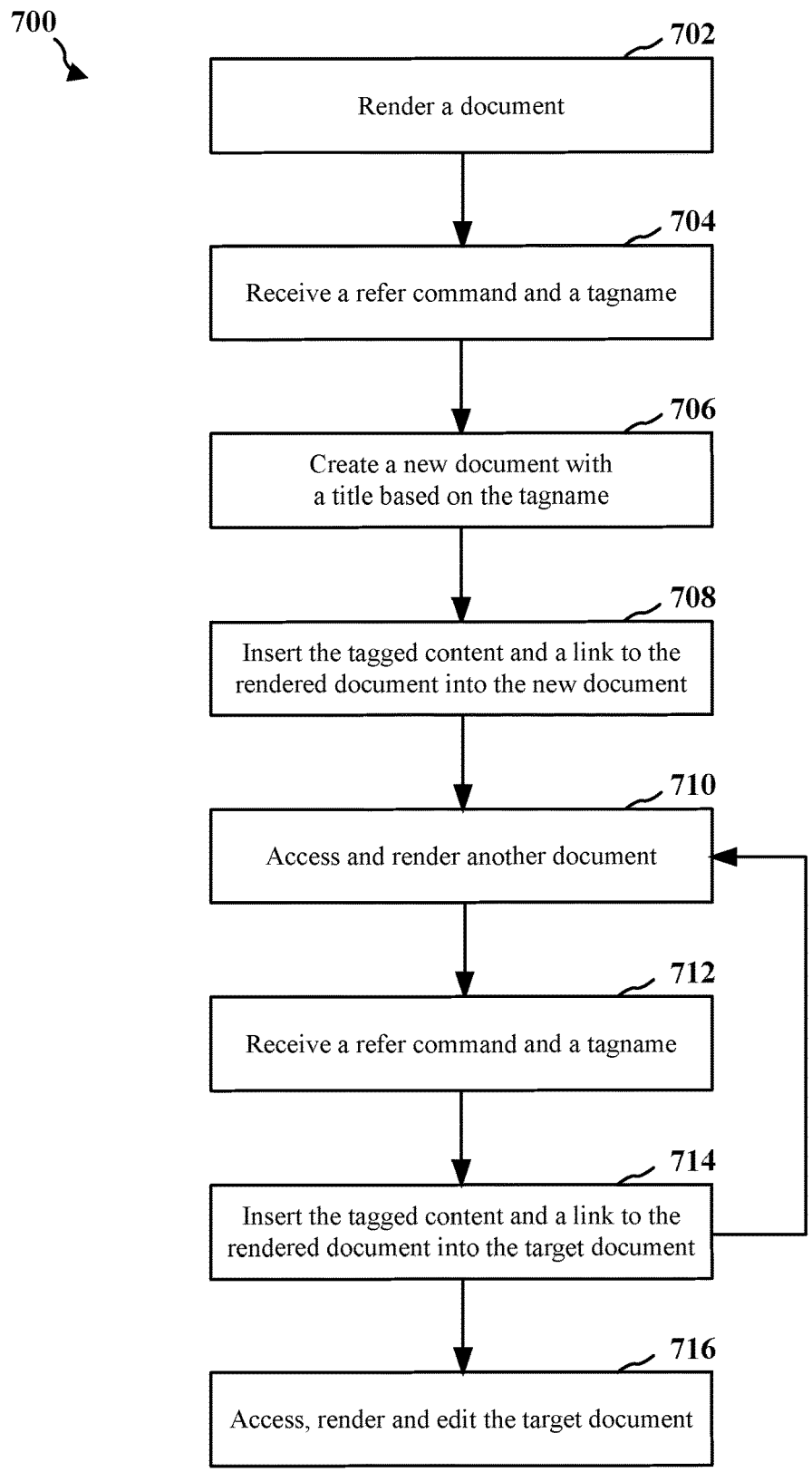
FIG. 7 is a flowchart for a method for generating a collection document using refer commands in accordance with an exemplary embodiment.

Referring to FIG. 7, a flowchart for a method for generating a collection document using refer commands in accordance with an exemplary embodiment is illustrated. Exemplary method 700 is provided by way of example, as there are a variety of ways to carry out the method. Method 700 described below can be carried out using the configurations illustrated in FIGS. 1-4 by way of example, and various elements of these figures are referenced in explaining exemplary method 700. Each block shown in FIG. 7 represents one or more processes, methods or subroutines, carried out in exemplary method 700. Exemplary method 700 can begin at block 702.

At block 702, render a document. For example, a processor 208, a web browser 260, a document editor 270, a document editor 404, and/or the client application 200 of the client device 120 renders the document on the display 210 of client device 120. FIG. 6A shows a document entitled "Make a Photo Album," being rendered in a user interface 600 on a display 210 of a client device 120. After rendering the document, the method 700 can proceed to block 704.

Figure 8A:
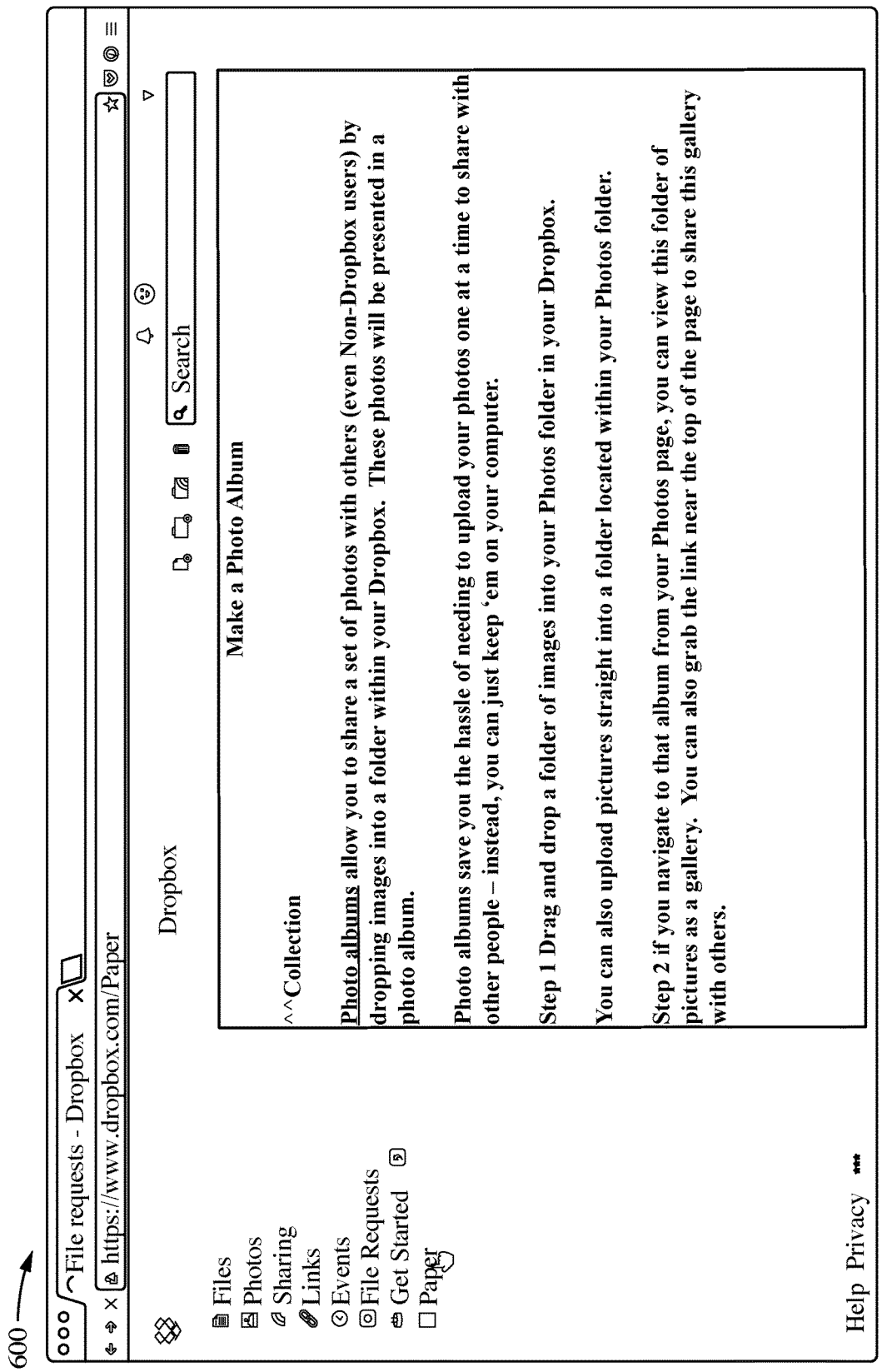
FIG. 8A is a user interface rendering a document having a refer command after the title in accordance with an exemplary embodiment.

At block 704, receive a refer command and a tagname. For example, the processor 208, web browser 260, document editor 270, document editor 404, and/or client application 200 of the client device 120 receives a linking/refer command and a tagname. FIG. 8A shows the Make a Photo Album document having a refer command and tagname inserted after the title of the document. For simplicity, in this example, the tagname is for a new document entitled "Collection." However, one of ordinary skill in the art can appreciate that the tagname can be for an existing document as discussed above with reference to FIG. 5. After receiving the refer command and tagname, the method 700 can proceed to block 706.

At block 706, create a new document with a title based on the tagname. For example, a processor 208, a web browser 260, a document editor 270, a document editor 404, and/or the client application 200 of the client device 120 creates the new document using the tagname. In this example, the new document or target document is entitled Collection. After creating the new document, the method 700 can proceed to block 708.

At block 708, insert the tagged content and a link to the rendered document into the new document. For example, a processor 208, a web browser 260, a document editor 270, a document editor 404, and/or the client application 200 of the client device 120 inserts the tagged content and a link to the rendered document into the new document. In this example, the tagged content "Make a Photo Album" and a link to the source document is inserted into the Collection document. After inserting the tagged content and the link to the rendered document into the new document, the method 700 can proceed to block 710.

Figure 8B:
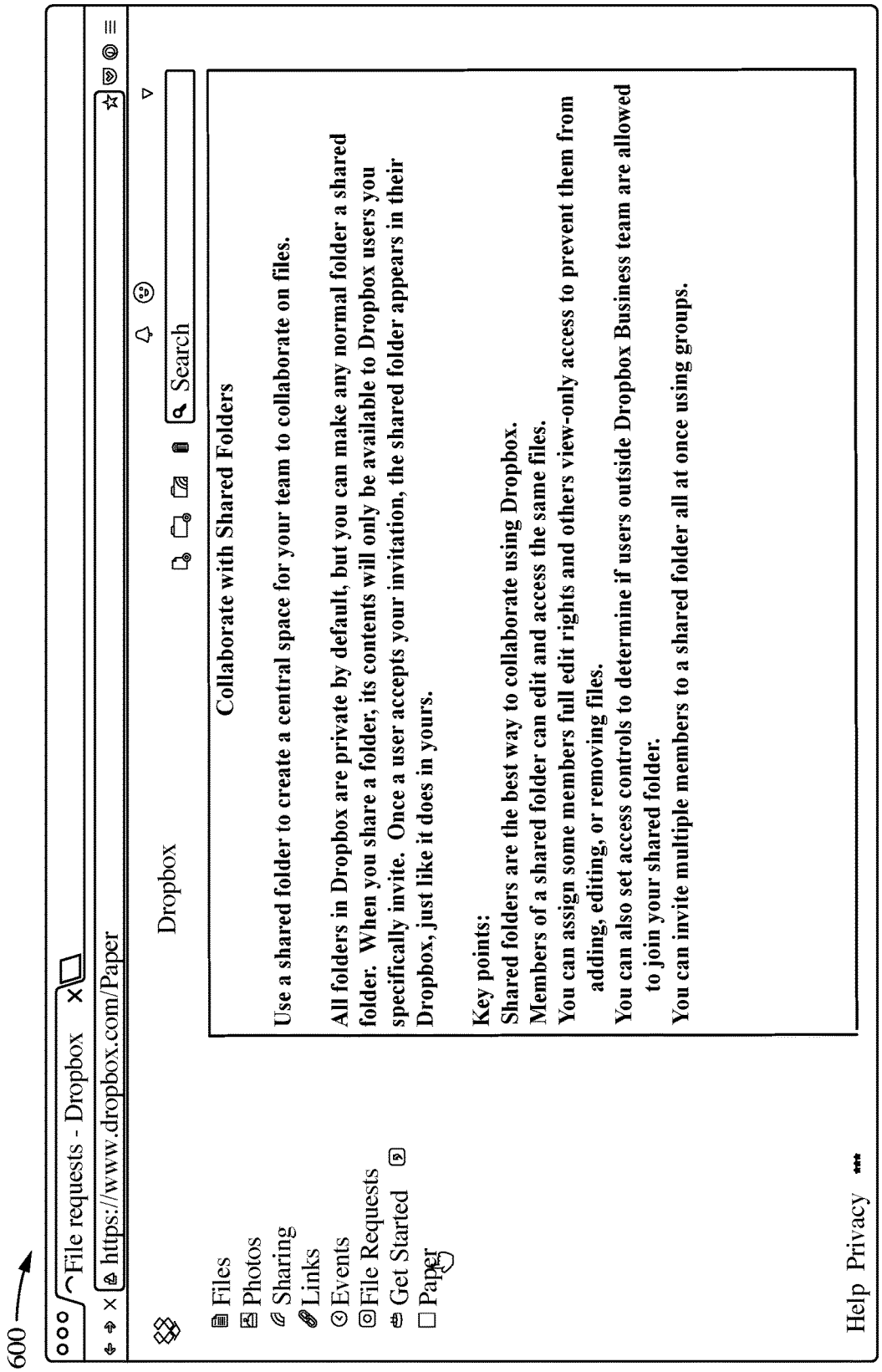
FIG. 8B is a user interface rendering another document in accordance with an exemplary embodiment.

At block 710, access and render another document. For example, a processor 208, a web browser 260, a document editor 270, a document editor 404, and/or the client application 200 of the client device 120 accesses another document and renders the document. FIG. 8B shows a document entitled "Collaborate with Shared Folders" being rendered in a user interface 800 on a display 210 of a client device 120. After accessing and rendering the document, the method 700 can proceed to block 710.

Figure 8C:
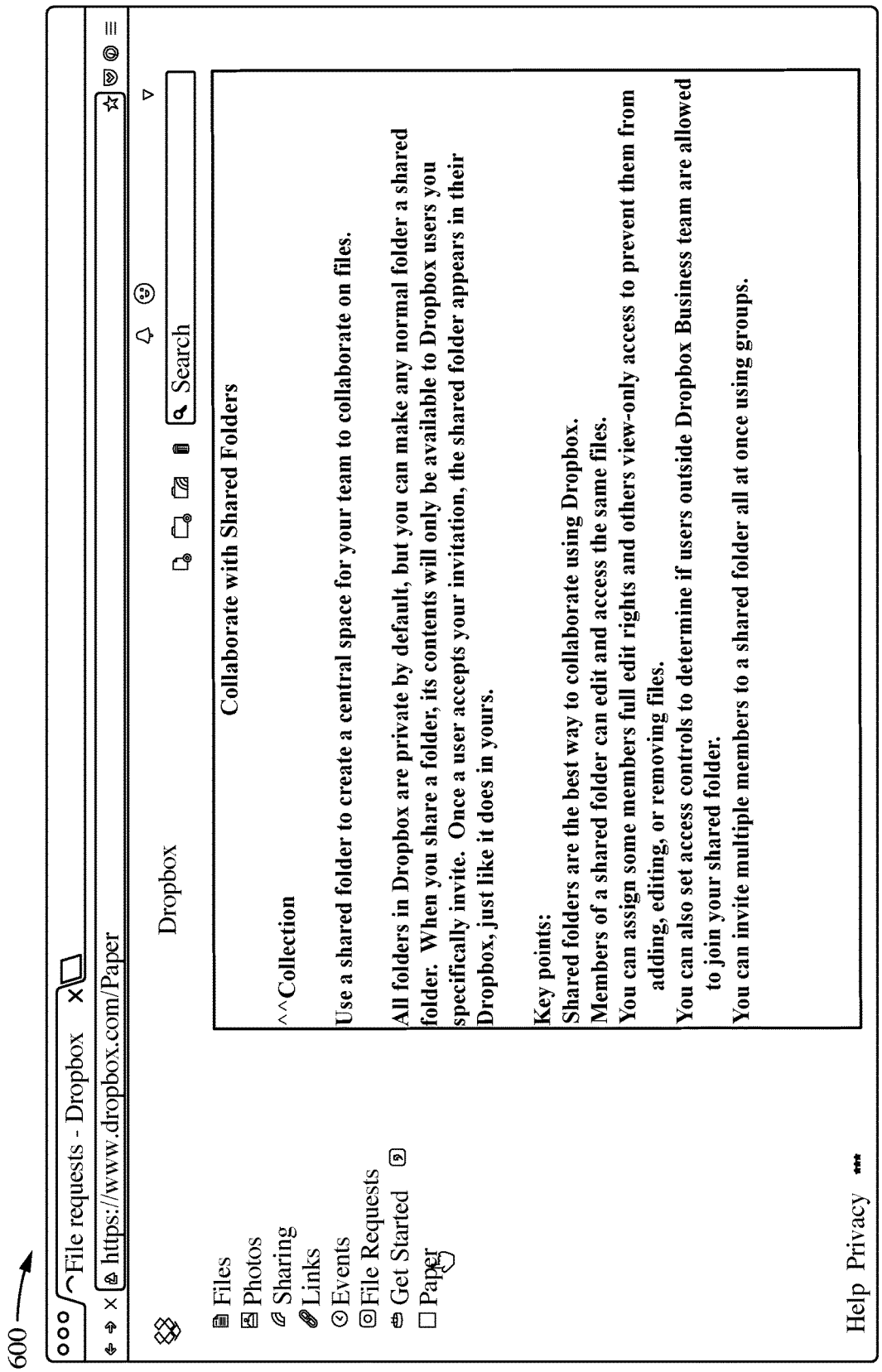
FIG. 8C is a user interface rendering another document having a refer command after the title in accordance with an exemplary embodiment.

At block 712, receive a refer command and a tagname. For example, the processor 208, web browser 260, document editor 270, document editor 404, and/or client application 200 of the client device 120 receives a linking/refer command and a tagname. FIG. 8C shows the rendered Collaborate with Shared Folders document having a refer command and tagname inserted after the title of the document. In this example, the tagname is for the existing target document entitled "Collection." After receiving the refer command and tagname, the method 700 can proceed to block 714.

Figure 8D:
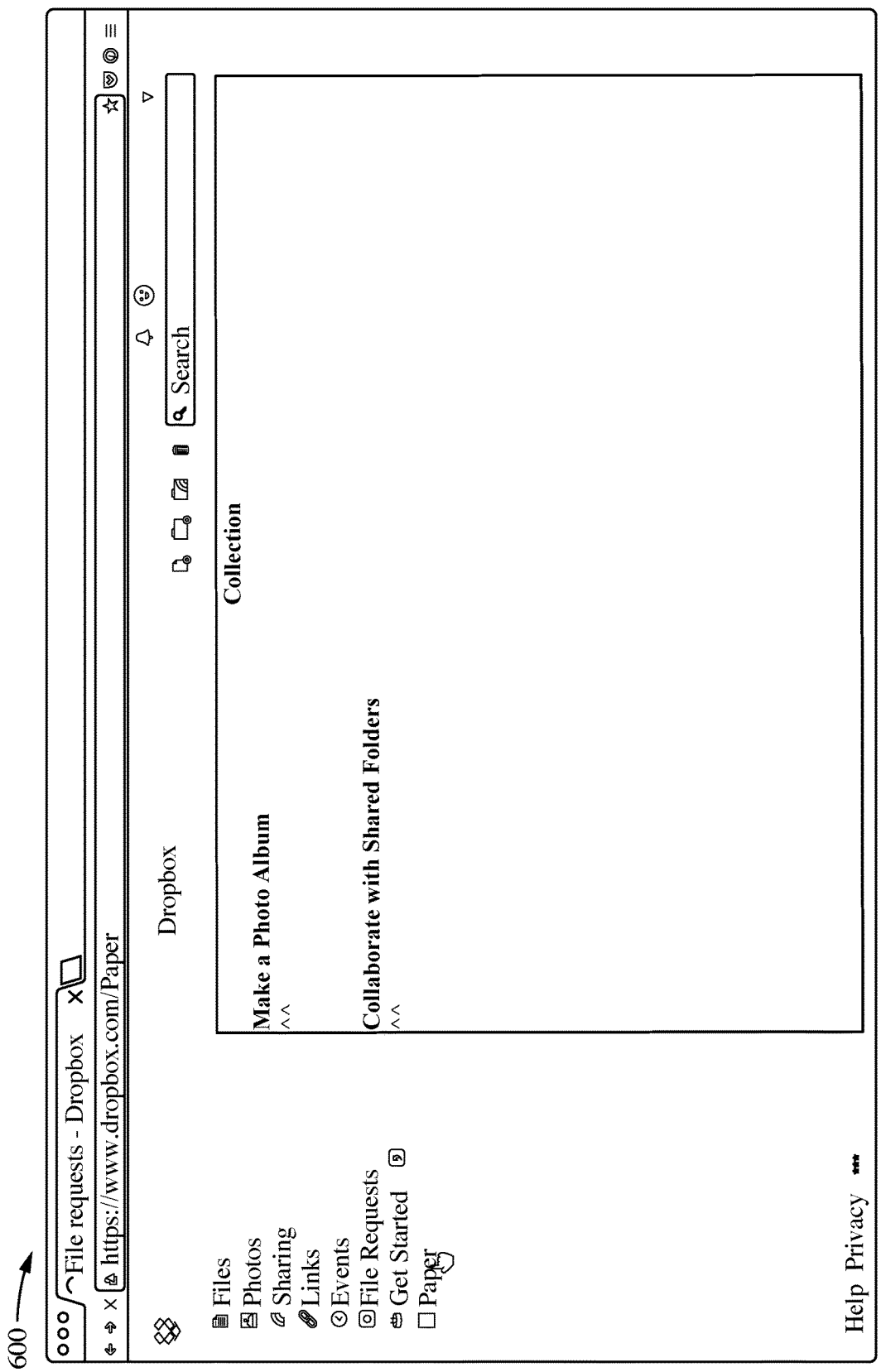
FIG. 8D is a user interface rendering a Collection having two titles and links in accordance with an exemplary embodiment.

At block 714, insert the tagged content and a link to the rendered document into the target document. For example, a processor 208, a web browser 260, a document editor 270, a document editor 404, and/or the client application 200 of the client device 120 inserts the tagged content and a link to the rendered document into the target document. In this example, the tagged content "Collaborate with Shared Folders" and a link to the source document is inserted into the Collection document. FIG. 8D shows the Collection document having the tagged content "Make a Photo Album," the tagged content "Collaborate with Shared Folders," and their associated links inserted into the target document. In this case, the first link is to the Make a Photo Album document and the second link is to the Collaborate with Shared Folders. After inserting the tagged content and the link to the rendered document into the target document, the method 700 can proceed to block 710 if the user wants to add other documents to the Collection document. After inserting the tagged text and the link to the rendered document into the target document, the method 700 can proceed to block 716 if the user wants to edit the new document.

At block 716, access, render and edit the target document. For example, the processor 208, web browser 260, document editor 270, document editor 404, and/or client application 200 of the client device 120 can access, render and edit the target document. In this example, the user can access the target document, e.g., Collection, and can edit the content which was copied from one or more other documents, e.g., Making a Photo Album document or Collaborate with Shared Folders document. The edits can include new content which is added to the target document, e.g., the Collection document.

For simplicity, the method 700 of FIG. 7 is directed to using the refer command and tagnames without subjects, however, one of ordinary skill in the art can appreciate that the method can include a tagname with a subject as described in FIG. 5.

Send to File Command

Figure 9A:
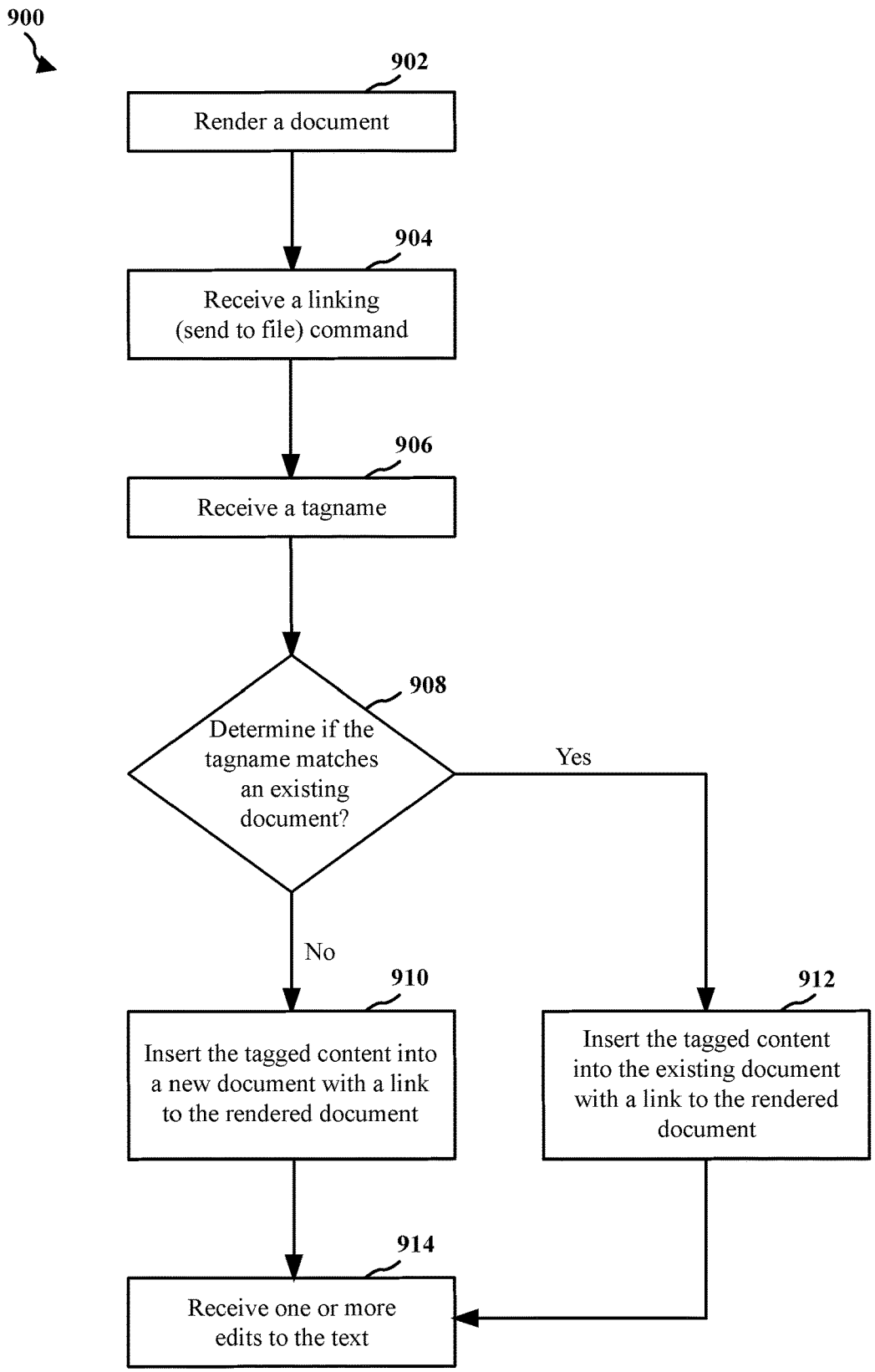
FIG. 9A is a flowchart for a method for executing a send to file command to copy a selection from a rendered document into another document in accordance with an exemplary embodiment.
Figure 9B:
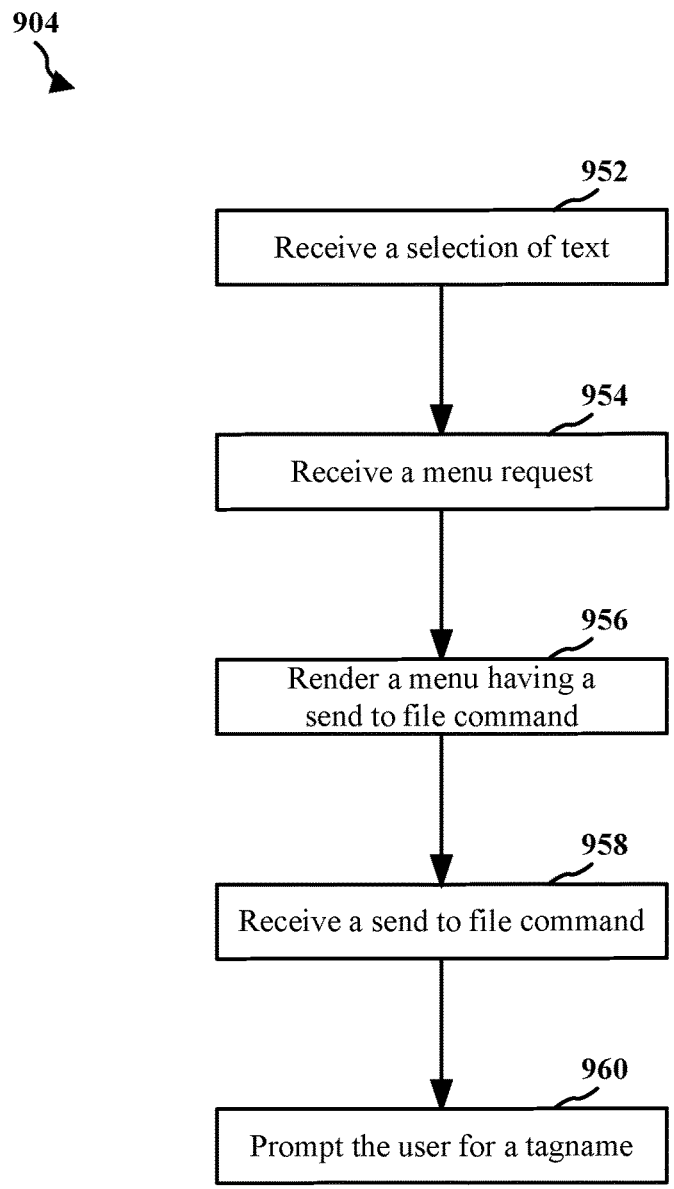
FIG. 9B is a flowchart for a method for receiving a send to file command in accordance with an exemplary embodiment.

Referring to FIGS. 9A and 9B, a flowchart for a method for executing a send to file command to copy a selection from a rendered document into another document in accordance with an exemplary embodiment is illustrated. Exemplary method 900 is provided by way of example, as there are a variety of ways to carry out the method. Method 900 described below can be carried out using the configurations illustrated in FIGS. 1-4 by way of example, and various elements of these figures are referenced in explaining exemplary method 900. Each block shown in FIGS. 9A and 9B represents one or more processes, methods or subroutines, carried out in exemplary method 900. Exemplary method 900 can begin at block 902.

Figure 10A:
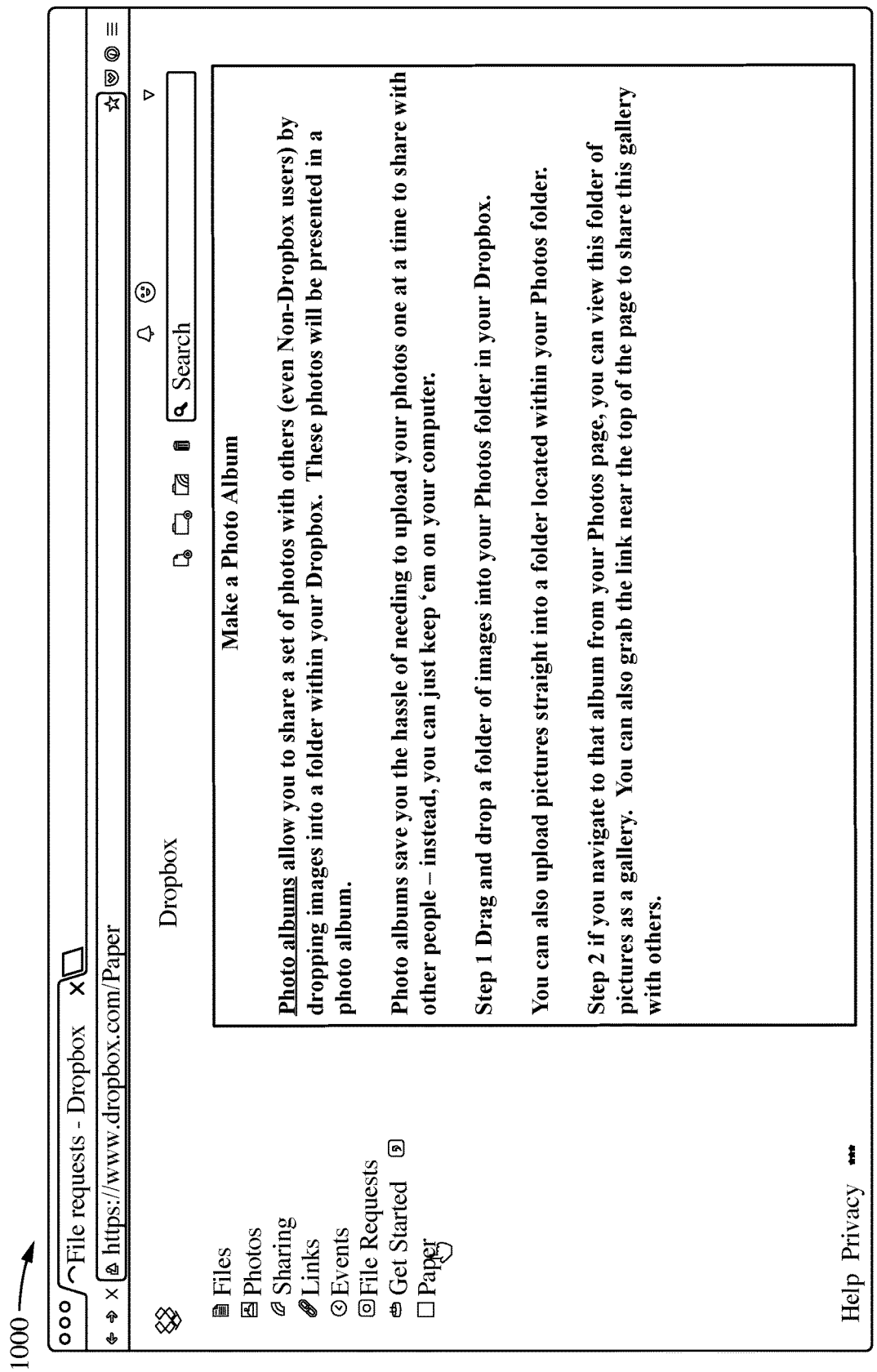
FIG. 10A is a screenshot of a user interface rendering a document with a selected portion in accordance with an exemplary embodiment.

At block 902, render a document. For example, a processor 208, a web browser 260, a document editor 270, a document editor 404, and/or the client application 200 of the client device 120 renders the document on the display 210 of client device 120. FIG. 10A shows a document entitled "Make a Photo Album, being rendered in a user interface 1000 on a display 210 of a client device 120. After rendering the document, the method 900 can proceed to block 904.

At block 904, receive a linking command, and more specifically a send to file command. For example, the processor 208, web browser 260, document editor 270, document editor 404, and/or client application 200 of the client device 120 receives a send to file command. After receiving a send to file command, the method 900 can proceed to block 906.

Figure 10B:
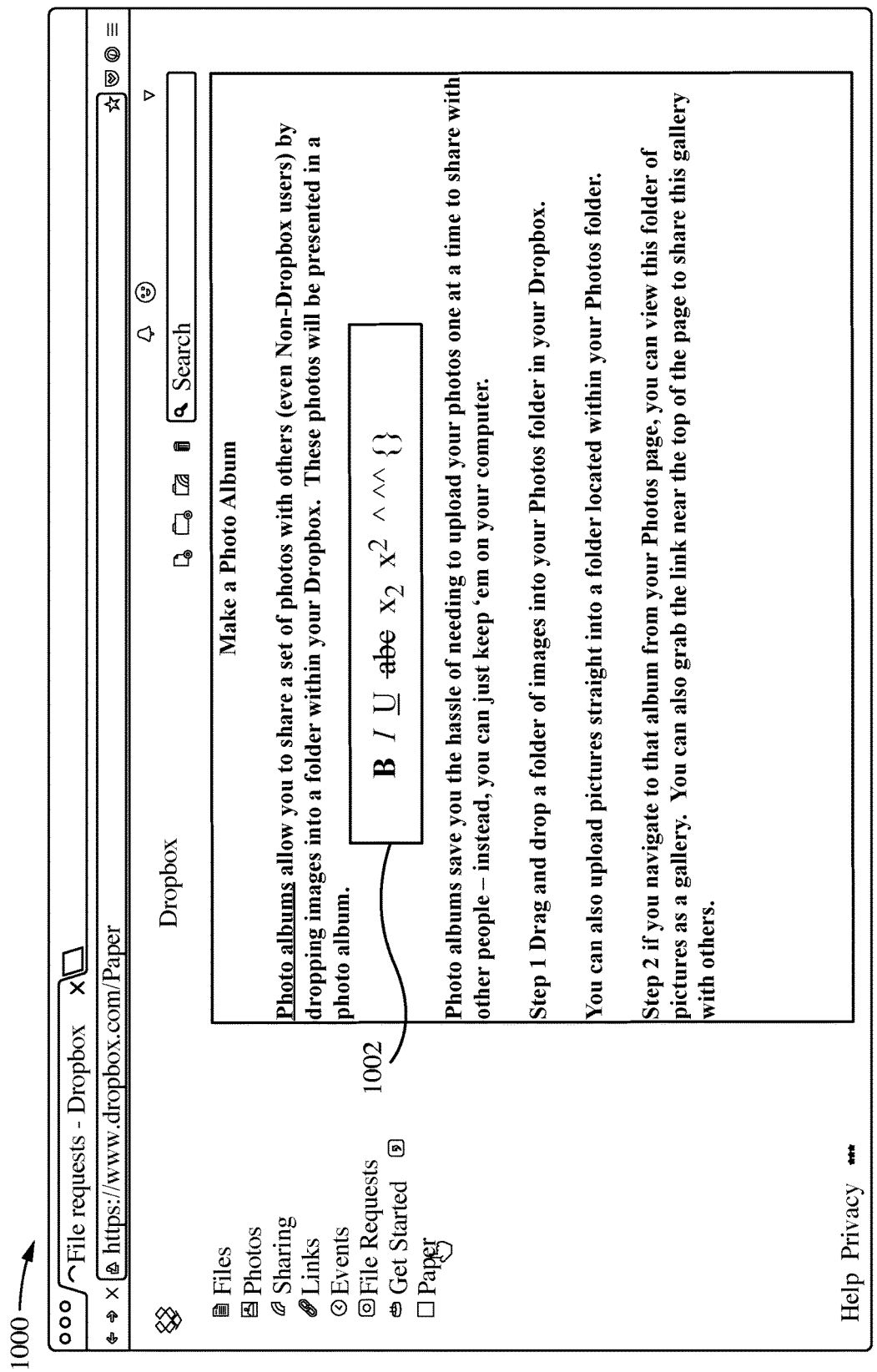
FIG. 10B is a user interface rendering a document with a displayed menu in accordance with an exemplary embodiment.

FIG. 9B shows block 904 in further detail. At block 952, receive a selection of text. For example, the processor 208, web browser 260, document editor 270, document editor 404, and/or client application 200 of the client device 120 receives a selection of text. The selection of text can be done by selecting text using a mouse, finger gesture or keyboard commands. For example, a user can select text by using a left click on a mouse and dragging the cursor to select the text. In another example, a user can right click on the mouse at the end of a paragraph to select the paragraph. FIG. 10B shows a first paragraph of the Make a Photo Album document being selected to have the selected portion of the document (e.g., the tagged content) copied into another document. After selecting text, the method 904 can proceed to block 954.

At block 954, receive a menu request. For example, the processor 208, web browser 260, document editor 270, document editor 404, and/or client application 200 of the client device 120 receives a menu request, e.g., a right click on the mouse or a gesture on a touchscreen. After receiving a menu request, the method 904 can proceed to block 956.

At block 956, render a menu having a send to file command. For example, the processor 208, web browser 260, document editor 270, document editor 404, and/or client application 200 of the client device 120 renders a menu having a send to file command (e.g., icon). FIG. 10B shows a popup menu 1002 having a send to file icon shown as a "{ }" and a refer icon shown as "^ ^^". One of ordinary skill in the art can appreciate that other text or symbols can be used in place of the send to file icon and/or refer icon. As shown, the popup menu 1002 can include common menu commands, such as bold ("B"), italics ("I"), underline ("U"), strikethrough (""), subscript ("$x_2$") and superscript ("$x^2$"). After rendering a menu, the method 904 can proceed to block 958.

At block 958 receive a send to file command. For example, the processor 208, web browser 260, document editor 270, document editor 404, and/or client application 200 of the client device 120 receives a selection of the send to file command/icon from the popup menu 1002. To select the send to file command a user can left click on the send to file icon, e.g., "{ }". After receiving a send to file command, the method 904 can proceed to block 960.

Figure 10C:
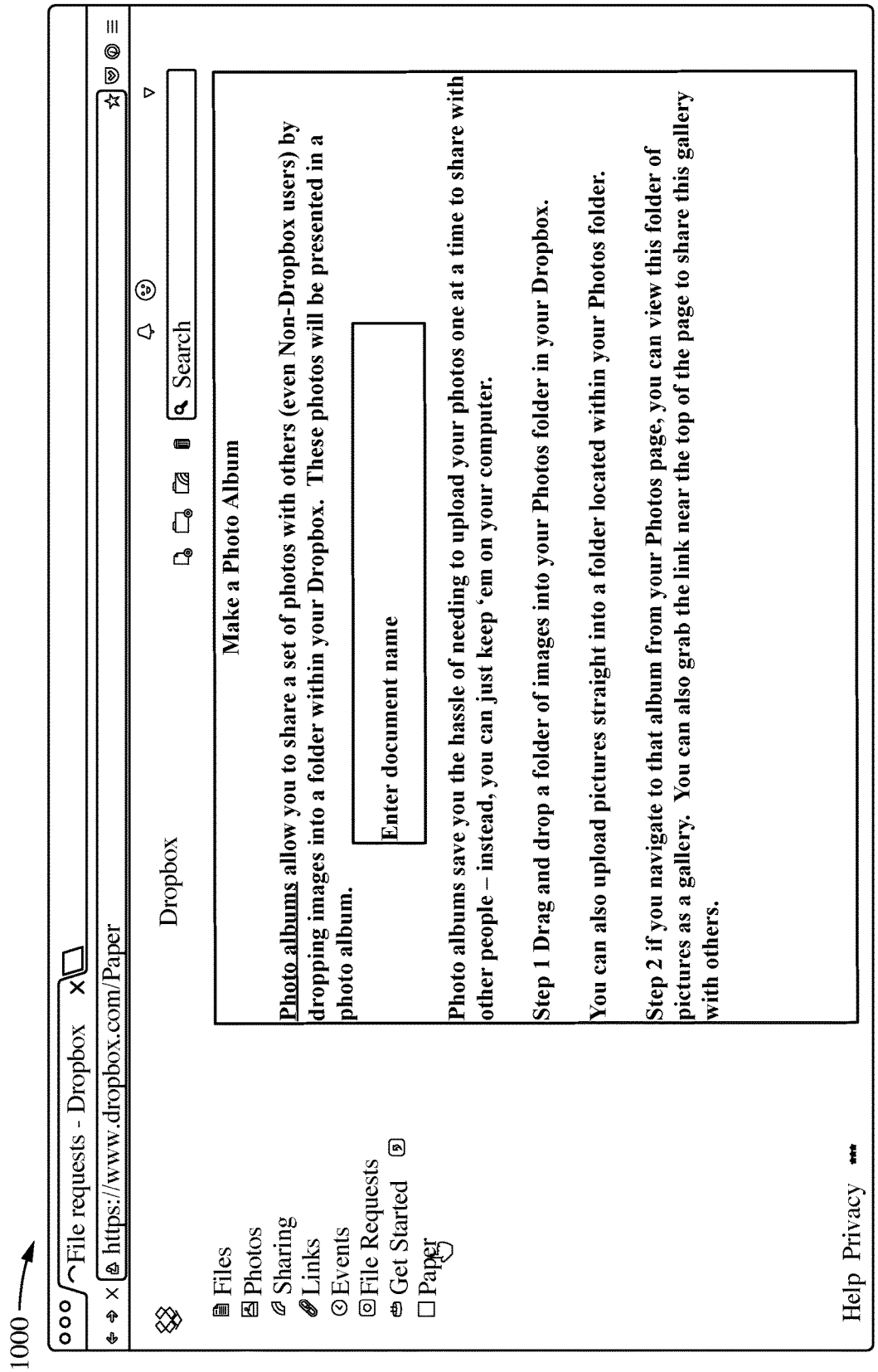
FIG. 10C is a user interface rendering a document with a prompt to enter a document name in accordance with an exemplary embodiment.

At block 960, prompt the user for a tagname. For example, the processor 208, web browser 260, document editor 270, document editor 404, and/or client application 200 of the client device 120 prompts the user to enter a tagname. FIG. 10C shows a prompt asking the user for a tagname, e.g., "Enter document name." After prompting the user for a tagname, method 904 can proceed to block 906.

Figure 10D:
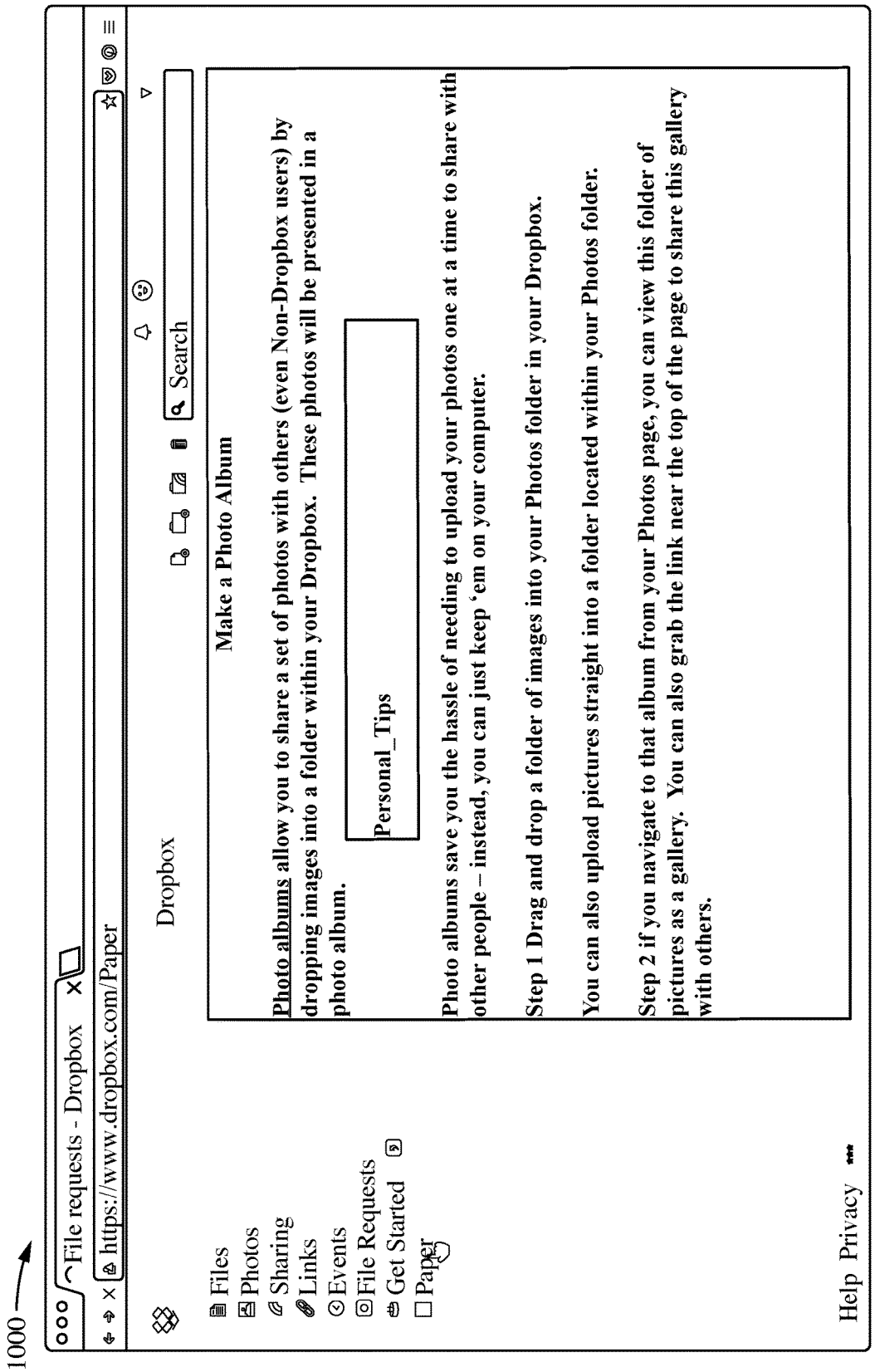
FIG. 10D is a user interface rendering a document with an entered document name in accordance with an exemplary embodiment.
Figure 10E:
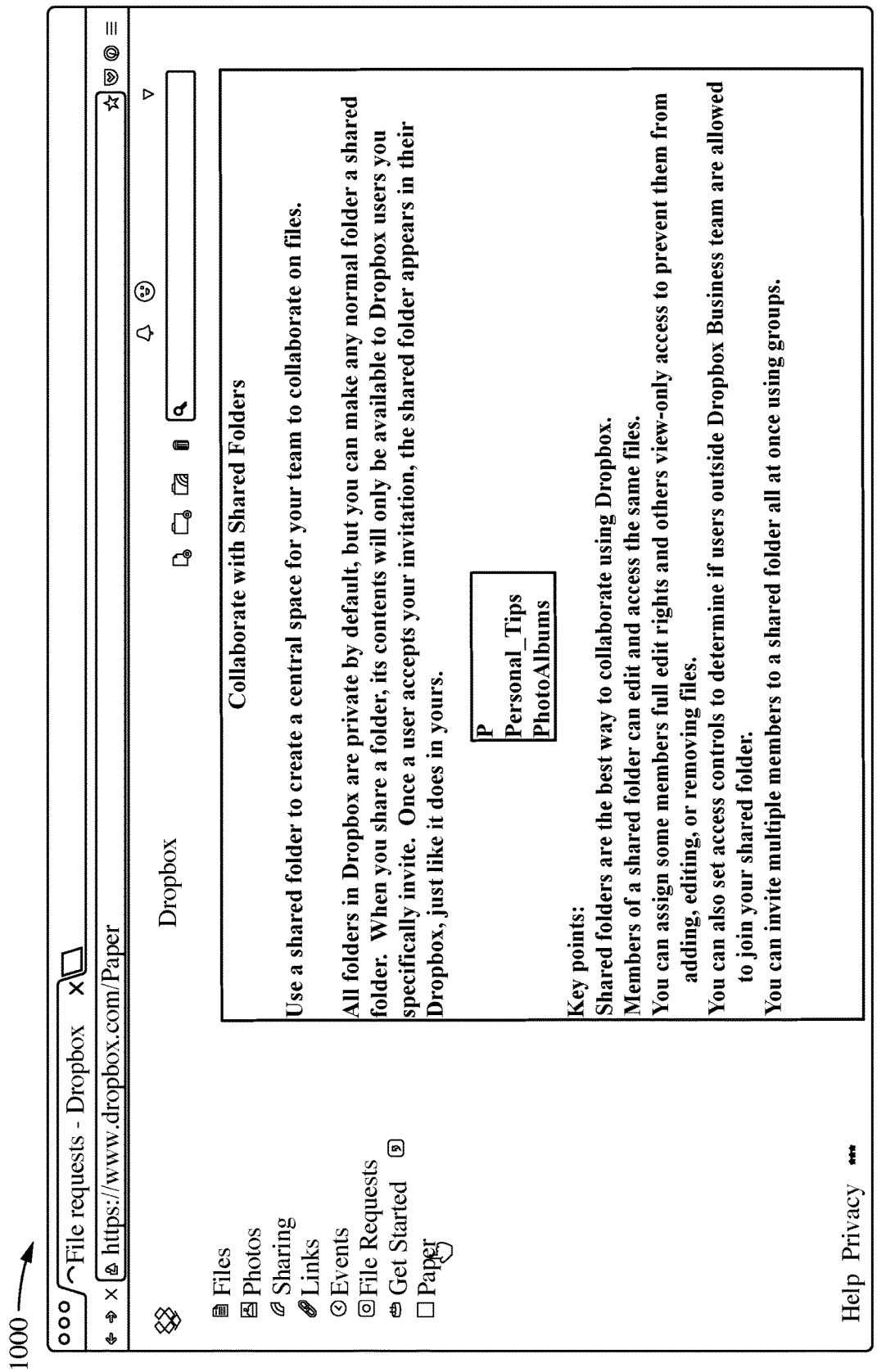
FIG. 10E is a user interface rendering a document with a list of potential file names in accordance with a second exemplary embodiment.
Figure 10F:
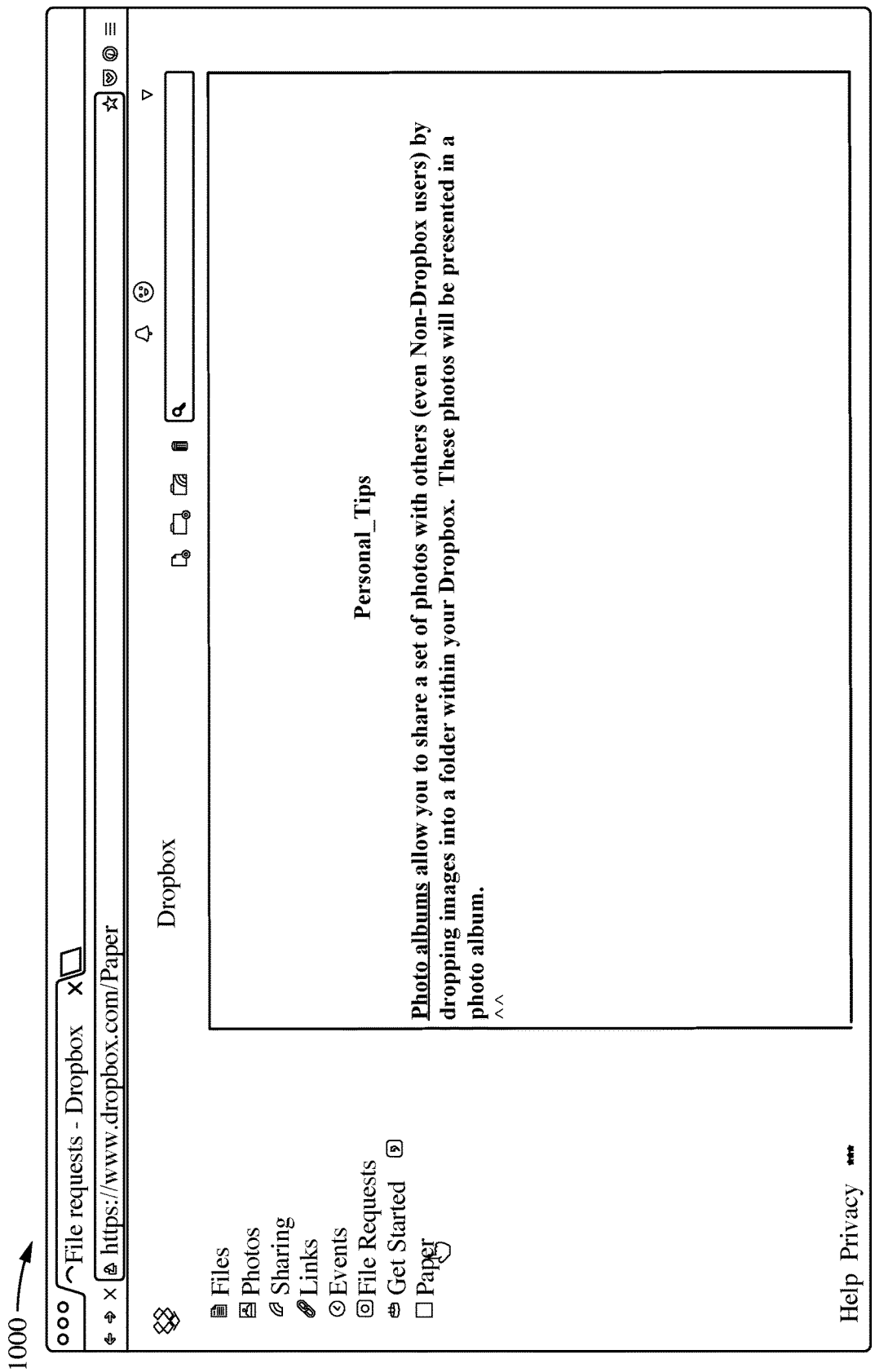
FIG. 10F is a user interface rendering a document with tagged content in accordance with an exemplary embodiment.

At block 906, receive a tagname. For example, the processor 208, web browser 260, document editor 270, document editor 404, and/or client application 200 of the client device 120 receives a tagname or document name. The tagname can be a new document or an existing document. FIG. 10D shows the entered tagname being "Personal_Tips." In this example, the user wants to copy the first paragraph of Make a Photo Album into a new document entitled Personal_Tips. FIG. 10F shows the entered tagname being the "P" for "Personal_Tips." In this example, the user wants to copy the second paragraph of Collaborate with Shared Folders into the existing document entitled Personal Tips. As shown, the user starts to enter the tagname of Personal Tips by typing 'P." In response to receiving the tagname, the user can be prompted to select a tagname from a displayed list of potential tagnames for the tagged paragraph as shown in FIG. 10E. For example, in response to the user starting to enter the tagname, the processor 208, web browser 260, document editor 270, document editor 404, and/or client application 200 of the client device 120 can search for documents or files that are associated with the user and can cause the rendering of the list of potential tagnames based on the entered letter (e.g., "P") or entered letters. The user can continue typing the tagname or select a tagname from the displayed list of potential tagnames. After receiving a tagname, the method 900 can proceed to block 908.

At block 908, determine if the tagname matches an existing document. For example, the processor 208, web browser 260, document editor 270, document editor 404, and/or client application 200 of the client device 120 searches for documents or files that are associated with the user and determine whether the tagname is for an existing document or a new document. If the tagname is for a new document, the method can proceed to block 910. If the tagname is for an existing document, the method 900 can proceed to block 912.

At block 910, insert the selected or tagged content into a new document with a link to the rendered document. For example, the processor 208, web browser 260, document editor 270, document editor 404, and/or client application 200 of the client device 120 inserts the tagged content (e.g., the selected portion of the rendered document associated with the send to file command) into a new document with a link to the rendered document. FIG. 10F shows a new document, e.g., Personal_Tips, having the tagged paragraph which was tagged in FIG. 10D. As shown, the inserted text or tagged text include a link, e.g., ^^, to the rendered document from which the text was copied from. One of ordinary skill in the art can appreciate that other text or symbols can be used in place of the ^^ as the link. The link is a hyperlink to the document that the inserted text or tagged text was copied from. In this example, the link is to the Making a Photo Album document. After inserting the tagged content into the new document with a link to the rendered document, the method 900 can proceed to block 914.

Figure 10G:
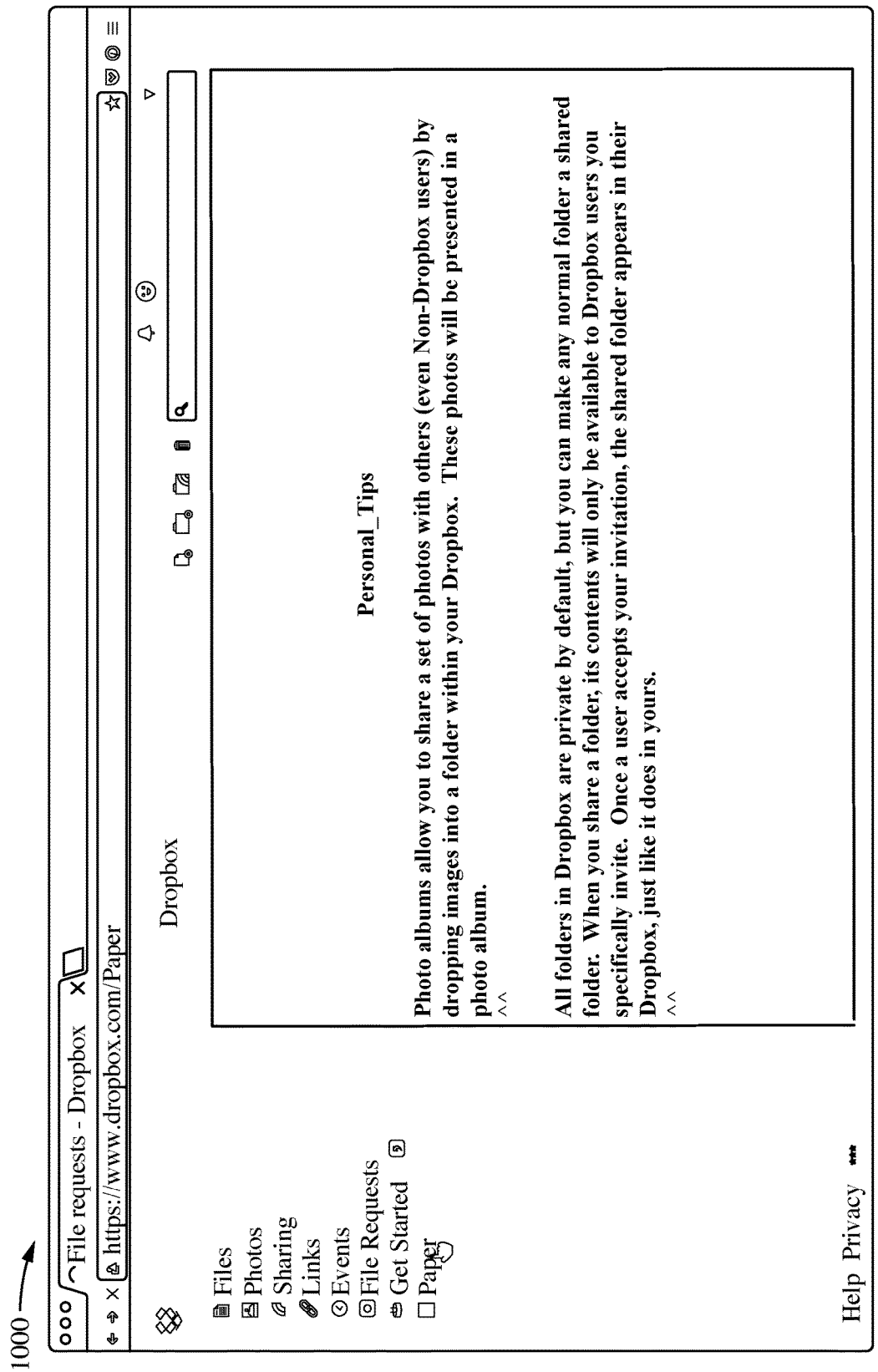
FIG. 10G is a user interface rendering a document with tagged content in accordance with a second exemplary embodiment.

At block 912, insert the selected content or tagged content into the existing document with a link to the rendered document. For example, the processor 208, web browser 260, document editor 270, document editor 404, and/or client application 200 of the client device 120 inserts the selected content or tagged content into the existing document with a link to the rendered document. FIG. 10G shows an existing document, e.g., Personal_Tips, having two tagged paragraphs which were tagged in FIGS. 10E and 10F.

As shown, each of the inserted content or tagged content include a link, e.g., ˆˆ, to the rendered document from which the text was copied from. The link is a hyperlink to the rendered document that the inserted content or tagged content was copied from. In this example, the link for the first tagged content is to the Making a Photo Album document and the link for the second tagged content is to Collaborate with Shared Folders document. After inserting the tagged content into the existing document with a link to the rendered document, the method 900 can proceed to block 914.

At block 914, receive one or more edits to the content. For example, the processor 208, web browser 260, document editor 270, document editor 404, and/or client application 200 of the client device 120 can receive one or more edits to the content. In this example, the user can access the new document, e.g., Personal_Tips, and can edit the content which was copied from the other documents, e.g., the Making a Photo Album document and the Collaborate with Shared Folders. The edits can include new content, e.g., text, which is added to the new document. The tagged content can be added to the end of the target document. In one or more other embodiments, tagged content can be added to the beginning of the target document. The user can re-arrange the ordering of the content by editing or moving the tagged content.

For simplicity, the method 900 of FIG. 9 is directed to using send to file command and tagnames without subjects, however, one of ordinary skill in the art can appreciate that a tagname can include a subject as described in FIG. 5. The send to file command can be used to create a collection document having links to existing documents. For example, a user may have several documents that cover different aspects of a single topic. By using the send to file command, the user can generate a new document or supplement an existing document that includes content from one or more source documents with links to the corresponding source documents. However, unlike the refer command, the source document does not include visible text related to the send to file command.

Exemplary System

Figure 11A:
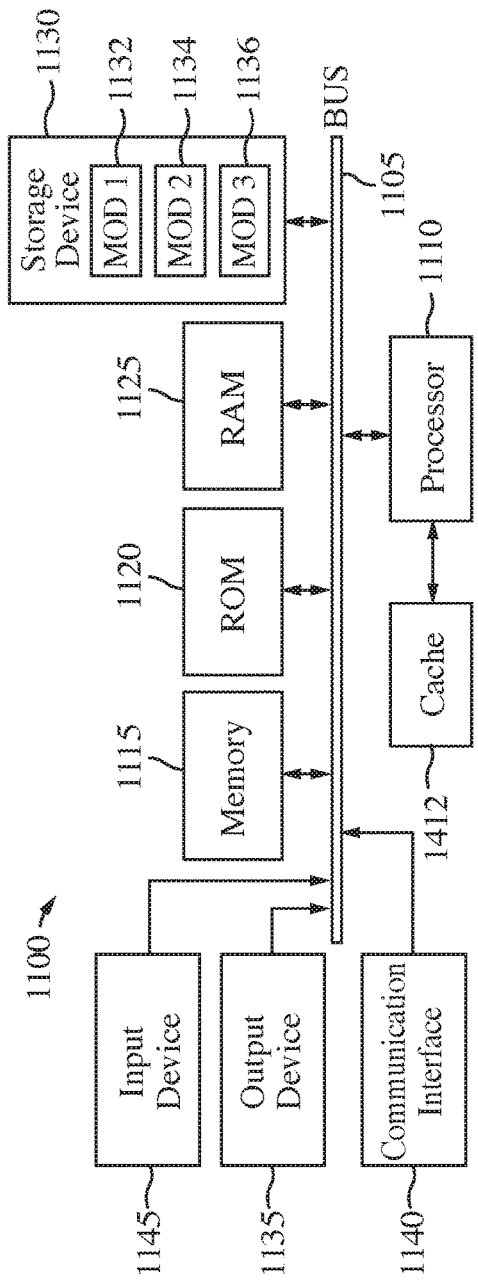
FIG. 11A is a block diagram of a system for implementing various embodiments of the present technology in accordance with an exemplary embodiment.
Figure 11B:
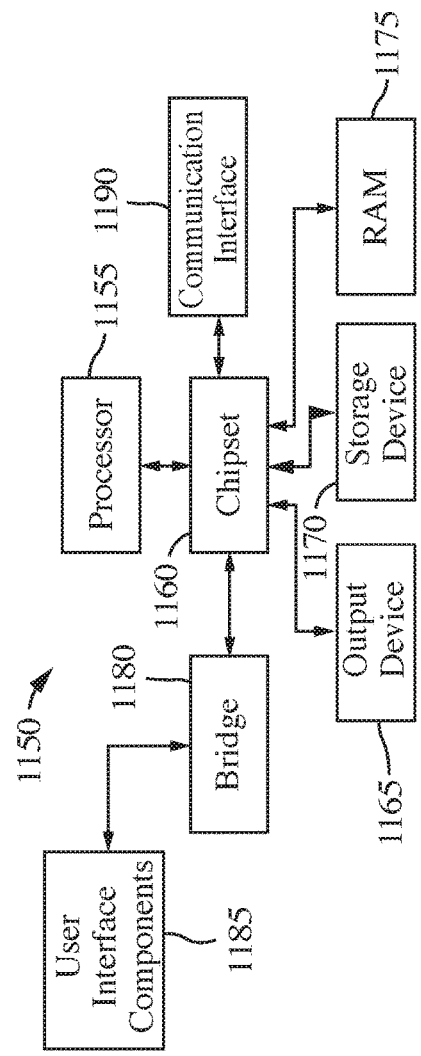
FIG. 11B is a block diagram of a system for implementing various embodiments of the present technology in accordance with an alternative exemplary embodiment.

FIGS. 11A and 11B show exemplary possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 1100 and 1150 can have more than one processor 1110 or be part of a group or cluster of computing devices networked together to provide greater processing capability.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other processes, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
providing, by a content management system, a document for rendering on a client device;
receiving, by the content management system from the client device, an indication of user input identifying a linking command and a tagname, wherein the linking command relates to content from the rendered document and the tagname identifies a target document;
accessing the target document based on the tagname; and
inserting, by the content management system, the content from the rendered document into the target document with a link to the rendered document.

2. The computer-implemented method of claim 1, wherein the content from the rendered document comprises a paragraph or a sentence in which the linking command was entered or a selected portion of the rendered document.

3. The computer-implemented method of claim 1, wherein inserting the content from the rendered document into the target document comprises inserting the content from the rendered document into the target document without providing the target document for display within the client device.

4. The computer-implemented method of claim 1, wherein the linking command comprises a starting indicator and an ending indicator and the content from the rendered document is located between the starting indicator and the ending indicator.

5. The computer-implemented method of claim 1, wherein the user input further identifies a subject.

6. The computer-implemented method of claim 5, wherein the inserting the content from the rendered document into the target document comprises:
   determining the target document does not comprise the subject;
   and
   based on determining the target document does not comprise the subject;
      inserting the subject into the target document; and
      inserting the content from the rendered document under the subject in the target document.

7. The computer-implemented method of claim 1, wherein inserting the content from the rendered document into the target document comprises inserting the content from the rendered document into the target document without further indication of user input by a user.

8. The computer-implemented method of claim 1, wherein receiving the indication of the user input identifying the linking command comprises receiving, from the client device, an indication of a textual input comprising the linking command.

9. The computer-implemented method of claim 8, wherein:
   accessing the target document comprises accessing an existing document using the tagname; and
   inserting the content from the rendered document into the target document comprises inserting the content from the rendered document into the existing document.

10. The computer-implemented method of claim 1, wherein:
   accessing the target document comprises creating a new document using the tagname; and
   inserting the content from the rendered document into the target document comprises inserting the content from the rendered document into the new document.

11. The computer-implemented method of claim 1, further comprising:
   providing, by the content management system, a second document for rendering on a client device;
   receiving an indication of a second linking command and the tagname within the second rendered document, wherein the second linking command identifies content from the second rendered document and the tagname identifies the target document;
   accessing the target document based on the tagname; and
   inserting, by the content management system, the content from the second rendered document into the target document with a second link to the second rendered document.

12. A content management system comprising:
   at least one processor; and
   at least one non-transitory computer-readable storage medium comprising instructions that, when executed by the at least one processor, cause the content management system to:
      provide a document for rendering on a client device;
      receive, from the client device, an indication of user input identifying a linking command and a tagname, wherein the linking command relates to content from the rendered document and the tagname identifies a target document;
      access the target document based on the tagname; and
      insert the content from the rendered document into the target document with a link to the rendered document.

13. The content management system of claim 12, wherein the content from the rendered document comprises a paragraph or a sentence in which the linking command was entered or a selected portion of the rendered document.

14. The content management system of claim 13, further comprising instructions that, when executed by the at least one processor, cause the content management system to:
   receive an indication of a user selection of the selected portion of the rendered document; and
   render a menu comprising a selectable option for the linking command.

15. The content management system of claim 12, further comprising instructions that, when executed by the at least one processor, cause the content management system to:
   access the target document by accessing an existing document using the tagname; and
   insert the content from the rendered document into the target document by inserting the content from the rendered document into the existing document.

16. The content management system of claim 12, further comprising instructions that, when executed by the at least one processor, cause the content management system to:
   access the target document by creating a new document using the tagname; and
   insert the content from the rendered document into the target document by inserting the content from the rendered document into the new document.

17. The content management system of claim 16, further comprising instructions that, when executed by the at least one processor, cause the content management system to:
   receive the indication of the user input identifying the linking command by receiving the indication of the user input further identifying a subject;
   determine the target document comprises the subject;
   based on determining the target document comprises the subject, insert the content from the rendered document under the subject in the target document.

18. The content management system of claim 12, further comprising instructions that, when executed by the at least one processor, cause the content management system to insert the content from the rendered document into the target document by inserting the content from the rendered document into the target document without providing the target document for display within the client device.

19. The content management system of claim 12, further comprising instructions that, when executed by the at least one processor, cause the content management system to:
   provide, for display within the rendered document, a first selectable option for a first linking command to insert content from the rendered document into an existing document and a second selectable option for a second linking command to insert content from the rendered document into a new document;
   receive the indication of the user input identifying the linking command by receiving, from the client device, an indication of a user selection of the first selectable option for the first linking command to insert content from the rendered document into the existing document; and based on receiving the indication of the user selection of the first selectable option for the first linking command, insert the content from the rendered document into the existing document as the target document.

20. The content management system of claim 12, further comprising instructions that, when executed by the at least one processor, cause the content management system to:
provide, for display within the rendered document, a first selectable option for a first linking command to insert content from the rendered document into an existing document and a second selectable option for a second linking command to insert content from the rendered document into a new document;
receive the indication of the user input identifying the linking command by receiving, from the client device, an indication of a user selection of the second selectable option for the second linking command to insert content from the rendered document into the new document; and
based on receiving the indication of the user selection of the second selectable option for the second linking command:
 access the target document by creating the new document using the tagname; and
 insert the content from the rendered document into the new document.

21. The content management system of claim 12, further comprising instructions that, when executed by the at least one processor, cause the content management system to:
provide a second document for rendering on a client device;
receive an indication of a second linking command and the tagname within the second rendered document, wherein the second linking command identifies content from the second rendered document and the tagname identifies the target document;
access the target document based on the tagname; and
insert the content from the second rendered document into the target document with a second link to the second rendered document.

22. A non-transitory computer readable storage medium storing instructions thereon that, when executed by at least one processor, cause a content management system to:
provide a document for rendering on a client device;
receive, from the client device, an indication of user input identifying a linking command and a tagname, wherein the linking command relates to content from the rendered document and the tagname identifies a target document;
access the target document based on the tagname; and
insert the content from the rendered document into the target document with a link to the rendered document.

23. The non-transitory computer readable storage medium of claim 22, further storing instructions thereon that, when executed by the at least one processor, cause the content management system to:
provide a second document for rendering on a client device;
receive an indication of a second linking command and the tagname within the second rendered document, wherein the second linking command identifies content from the second rendered document and the tagname identifies the target document;
access the target document based on the tagname; and
insert the content from the second rendered document into the target document with a second link to the second rendered document.

* * * * *